US011813790B2

(12) United States Patent
Rowe et al.

(10) Patent No.: US 11,813,790 B2
(45) Date of Patent: Nov. 14, 2023

(54) ADDITIVELY MANUFACTURED STRUCTURE AND METHOD FOR MAKING THE SAME

(71) Applicant: RapidFlight Holdings, LLC, Manassas, VA (US)

(72) Inventors: Kyle Rowe, Knoxville, TN (US); David Riha, Knoxville, TN (US); Charles Hill, Topton, NC (US); Alexis Fiechter, Mesa, AZ (US); Robert Bedsole, Knoxville, TN (US); Billy Hughes, Knoxville, TN (US)

(73) Assignee: RapidFlight Holdings, LLC, Manassas, VA (US)

( * ) Notice: Subject to any disclaimer, the term of this patent is extended or adjusted under 35 U.S.C. 154(b) by 619 days.

(21) Appl. No.: 16/538,681

(22) Filed: Aug. 12, 2019

(65) Prior Publication Data
US 2021/0046694 A1 Feb. 18, 2021

(51) Int. Cl.
*B33Y 10/00* (2015.01)
*B29C 64/118* (2017.01)
*B33Y 80/00* (2015.01)

(52) U.S. Cl.
CPC ............ *B29C 64/118* (2017.08); *B33Y 80/00* (2014.12); *B33Y 10/00* (2014.12)

(58) Field of Classification Search
CPC ........ B29C 64/118; B33Y 80/00; B33Y 10/00
See application file for complete search history.

(56) References Cited

U.S. PATENT DOCUMENTS

| 5,593,633 A | 1/1997 | Dull et al. |
| 5,939,008 A | 8/1999 | Comb et al. |
| 7,056,567 B2 | 6/2006 | O'Neill et al. |

(Continued)

FOREIGN PATENT DOCUMENTS

| CN | 106626369 A | 5/2017 |
| CN | 107097424 A | 8/2017 |

(Continued)

OTHER PUBLICATIONS

WO, International Search Report & Written Opinion, Application No. PCT/US19/46191, dated Nov. 8, 2019.

(Continued)

*Primary Examiner* — Rick K Chang
(74) *Attorney, Agent, or Firm* — Polsinelli PC

(57) ABSTRACT

An additively manufactured structure and methods for making and using same. In a method for making the structure, the structure can be printed using a single bead, according to a single toolpath, according to an open toolpath, or a combination thereof. Advantageously, printing efficiency can be improved. Geometry, size and/or shape of the structure can be selected with more flexibility. An exemplary method can form an overhang without using an infill or a support structure. Furthermore, the overhang can be formed accurately in an easy manner without a need of accurate positioning of the infill or the support structure. The printing process can be simplified. An alternative exemplary method can form a wall section that terminates by connecting to another wall section. Advantageously, the wall sections can be strong because of the mutual support and appearance of the terminated wall section can be improved.

22 Claims, 42 Drawing Sheets

(56) References Cited

U.S. PATENT DOCUMENTS

| | | | |
|---|---|---|---|
| 7,127,309 | B2 | 10/2006 | Dunn et al. |
| 8,994,592 | B2 | 3/2015 | Scott et al. |
| 9,399,320 | B2 | 7/2016 | Johnson et al. |
| 9,815,268 | B2 | 11/2017 | Mark et al. |
| 10,286,599 | B2 | 5/2019 | Jones |
| 10,322,530 | B2 | 6/2019 | Kawabe |
| 10,369,742 | B2 | 8/2019 | Scribner et al. |
| 10,442,003 | B2 | 10/2019 | Symeonidis et al. |
| 10,967,576 | B2 | 4/2021 | Fiechter et al. |
| 2005/0208168 | A1 | 9/2005 | Hickerson et al. |
| 2011/0241947 | A1 | 10/2011 | Scott et al. |
| 2012/0115379 | A1 | 5/2012 | Kim |
| 2012/0323345 | A1 | 12/2012 | Jonas et al. |
| 2014/0333011 | A1 | 11/2014 | Javidan et al. |
| 2015/0024169 | A1 | 1/2015 | Martin |
| 2015/0048555 | A1 | 2/2015 | Nagasaki et al. |
| 2015/0061170 | A1 | 3/2015 | Engel et al. |
| 2015/0291921 | A1 | 10/2015 | Rives |
| 2016/0039194 | A1 | 2/2016 | Cable |
| 2016/0136895 | A1 | 5/2016 | Beyer et al. |
| 2016/0176118 | A1 | 6/2016 | Reese et al. |
| 2016/0185041 | A1 | 6/2016 | Lisagor et al. |
| 2016/0193791 | A1 | 7/2016 | Swanson et al. |
| 2016/0207263 | A1 | 7/2016 | Gordon |
| 2016/0332382 | A1 | 11/2016 | Coward et al. |
| 2016/0332387 | A1 | 11/2016 | Jondal et al. |
| 2017/0036403 | A1 | 2/2017 | Ruff et al. |
| 2017/0037674 | A1 | 2/2017 | Hooper et al. |
| 2017/0073280 | A1 | 3/2017 | Jones |
| 2017/0144242 | A1 | 5/2017 | McQueen et al. |
| 2017/0182562 | A1 | 6/2017 | Das et al. |
| 2017/0182712 | A1 | 6/2017 | Scribner et al. |
| 2017/0217105 | A1 | 8/2017 | Taniuchi |
| 2017/0252980 | A1 | 9/2017 | Kelley et al. |
| 2017/0297320 | A1 | 10/2017 | Swanson |
| 2017/0305034 | A1 | 10/2017 | Grivetti et al. |
| 2017/0312986 | A1 | 11/2017 | Qian |
| 2018/0009172 | A1 | 1/2018 | Amba et al. |
| 2018/0099452 | A1 | 4/2018 | Ochi et al. |
| 2018/0117833 | A1 | 5/2018 | Nagahari et al. |
| 2018/0154441 | A1 | 6/2018 | Miller et al. |
| 2018/0182532 | A1 | 6/2018 | Stahr et al. |
| 2018/0207863 | A1 | 7/2018 | Porter et al. |
| 2019/0047221 | A1 | 2/2019 | Baltes |
| 2019/0077081 | A1 | 3/2019 | Susnjara et al. |
| 2019/0224909 | A1* | 7/2019 | Riha ................ B29C 64/245 |
| 2019/0240934 | A1 | 8/2019 | Prins et al. |
| 2020/0024414 | A1 | 1/2020 | Ichino et al. |
| 2021/0039315 | A1 | 2/2021 | Ciscon et al. |

FOREIGN PATENT DOCUMENTS

| | | |
|---|---|---|
| CN | 206884186 U | 1/2018 |
| EP | 3238865 A1 | 11/2017 |
| FR | 2998209 A1 | 5/2014 |
| JP | 2012024920 A | 2/2012 |
| JP | 2015/131469 A | 7/2015 |
| JP | 2017/171958 A | 9/2017 |
| JP | 2018034336 A | 3/2018 |
| JP | 2018/062062 B2 | 4/2018 |
| KR | 10-2016-0128657 A | 11/2016 |
| KR | 10-2017-0004469 A | 1/2017 |
| WO | 99/37454 A1 | 7/1999 |
| WO | 2013/136096 A1 | 9/2013 |
| WO | 2015/049834 A1 | 4/2015 |
| WO | 2016/136166 A1 | 9/2016 |
| WO | 2017/049155 A1 | 3/2017 |
| WO | 2017/078168 A1 | 5/2017 |
| WO | 2017/106965 A1 | 6/2017 |
| WO | 2017/159349 A1 | 9/2017 |
| WO | 2017/172574 A1 | 10/2017 |
| WO | 2017/180958 A2 | 10/2017 |

OTHER PUBLICATIONS

International Search Report and Written Opinion, dated Feb. 18, 2019 for PCT/US2018/060127 (15 pgs.).

International Search Report and Written Opinion for PCT/US2019/028775 dated Jan. 17, 2020 (37 pages).

International Search Report and Written Opinion for PCT/US2019/036603 dated Sep. 3, 2019 (15 pages).

Korean language Office Action, and English language translation, dated Oct. 26, 2021 for KR patent application No. 10-2020-7034143 (14 pages).

Korean language Office Action, and English language translation, dated Jun. 24, 2021 for KR patent application No. 10-2020-7027227 (3 pages).

Chinese language 2nd Office Action dated Aug. 12, 2022 for CN 20198009811.7 (5 pages).

Japanese language Office Action, and English language translation, dated Dec. 8, 2021 for JP 2020-261590 (9 pages).

Chinese language 2nd Office Action dated Jan. 5, 2022 for CN 201980014512.4 (3 pages).

Canadian Examiner's Report dated Feb. 16, 2022 for CA patent application No. CA3100846 (4 pages).

Chinese language 1st Office Action and Search Report dated Feb. 8, 2022 for CN 201980038575.3 (7 pages).

Korean language Decision of First Refusal, with English language translation, dated Apr. 27, 2022 for 10-2020-7034143 (7 pages).

Chinese language 1st Office Action dated Nov. 17, 2021 for CN 201980009811.7 (8 pgs.).

International Search Report and Written Opinion, dated Jul. 31, 2019, for PCT/US2019/018806 (11 pgs.).

Chinese language 2nd Office Action, with English language translation, dated Dec. 1, 2022 for CN patent application No. CN 201980038575.3 (8 pages).

Chinese language 2nd Office Action, with English language translation, dated Dec. 1, 2022 for CN patent application No. CN 201980027421.4 (15 pages).

* cited by examiner

ADDITIVELY MANUFACTURED STRUCTURE AND METHOD FOR MAKING THE SAME

FIELD

The disclosed embodiments relate generally to additive manufacturing and more particularly, but not exclusively, to additively manufactured structures and methods for making the same.

BACKGROUND

Traditional manufacturing techniques typically form parts by reducing or removing material from a bulk material. Three-dimensional (3D) printing, also known as additive manufacturing, is a technique that deposits materials only where needed, thus resulting in significantly less material wastage than traditional manufacturing techniques. In typical additive manufacturing processes, a 3D object is created by forming layers of material under computer control. While the first three-dimensional (3D) printed articles were generally models, the industry is quickly advancing by creating 3D printed articles that may be functional parts in more complex systems, such as hinges, tools, structural elements.

Additive manufacturing for making a 3D article on a large scale (i.e., typically with at least one dimension greater than 5 feet) can be referred to as large-scale additive manufacturing. A system (or technique) for large scale additive manufacturing can be referred to as a large scale additive manufacturing system (or technique). Exemplary large scale additive manufacturing systems include, for example, the Big Area Additive Manufacturing (BAAM) 100 ALPHA available from Cincinnati Incorporated located in Harrison, Ohio, or the Large Scale Additive Manufacturing (LSAM) machine available from Thermwood Corporation located in Dale, Ind. Exemplary systems that use extrusion deposition for large scale additive manufacturing includes the BAAM 100 ALPHA and the LSAM machine.

Large-scale additive manufacturing has recently become an area of greater research, use, and technological advancement because of improvements in material properties and increased needs of customized large structures. For example, Local Motors located in Phoenix, Ariz. was the first to use large-scale additive manufacturing, or large-scale extrusion deposition, to print a vehicle. However, large-scale additive manufacturing also faces great challenges.

One challenge in large-scale additive manufacturing is printing efficiency. Due to the large size of the printed object, printing time can be long and result in high labor cost and energy consumption. Furthermore, for an object with a complex shape, multiple toolpaths and multiple beads may be needed for printing each layer. Transitioning between different toolpaths can cost extra time, add additional complexity to the print, and introduce additional opportunities for errors during printing and in the final printed object.

In additive manufacturing, slicing software 'slices' an object designed in computer-aided design (CAD) program to define layers that stack into the object and, within each layer, define the toolpaths that a print head should follow when laying down beads. Due to limited functions of conventional slicing software, toolpaths based on a shape of a layer can only be created in specific ways without great freedom. FIG. 1 shows a solid shape 10. The shape 10 is printed by beads 12A, 12B respectively based on toolpaths 14A, 14B. The toolpath 14A is a closed toolpath defining an entire periphery 16 of the shape 10. The toolpath 14B, or a continuation (not shown) of toolpath 14A, is created to fill all the area enclosed by the bead 12A. Even if the shape 10 is small, the periphery 16 must still be printed and the width of the shape 10 must be not too much less than two times of the width of the bead 12A. If the shape 10 is smaller than two times of the width of the bead 12A by a certain amount (depending on the slicing software), the slicing software does not generate any toolpaths for printing.

For clarity of illustration, the beads 12A, 12B are shown in grey color. Further, a white gap is shown between the beads 12A, 12B for clear distinction, even though the gap may not exist in an actual print.

Further, FIG. 2A shows a shape 20 having a periphery 26. The shape 20 defines a void 28 surrounded by the periphery 21. The shape 20 is printed by beads 22A, 22B respectively based on toolpaths 24A, 24B. The toolpath 24A is a closed toolpath defining the entire periphery 26. The toolpath 24B is a closed toolpath defining the entire periphery 21. In conventional large scale additive manufacturing systems, one toolpath can only define one continuous boundary of a shape. Thus, the toolpaths 24A, 24B are needed for defining the two peripheries 26 and 21, respectively. Because the toolpaths 24A, 24B are minimum toolpaths required to print the shape 20, the distance between the peripheries 26, 21 must be not much less than the total width of the beads 22A, 22B, or a double of the width of the bead 22A because beads 22A, 22B have equal width. If the shape 20 is smaller than two times of the width of the bead 22A by a certain amount (depending on the slicing software), the slicing software does not generate any toolpaths for printing.

For clarity of illustration, the beads 22A, 22B are shown in grey color. Further, a white gap is shown between the beads 22A, 22B for easy visual distinction, even though the gap may not exist in an actual print.

FIG. 2B shows the shape 20 as having a junction wall 25 which is a joint section that contacts, and spans between, two opposite sides of the shape 20 to provide additional support to the shape 20. The shape 20 thus defines voids 28B, 28C. The shape 20 is printed by beads 22A-22C. The bead 22A forms the periphery 26. The beads 22B, 22C form the peripheries 21B, 21C, respectively. Because the beads 22B, 22C are minimum beads required to print the reinforcement structure 25, width of the junction wall 25 must be not much less than the total width of the beads 22B, 22C. If the junction wall 25 is narrower than total width of the beads 22B, 22C by a certain amount (depending on the slicing software), the slicing software does not generate any toolpaths for printing.

Therefore, the inventors of the present application recognize that existing ways of creating toolpaths takes a long printing time and restricts geometry, size, and shape of printed structures. Especially, a joint structure, such as the junction wall 25, cannot be printed at high efficiency. Such challenges cannot be resolved by any technology used in smaller-scale additive manufacturing, because smaller-scale additive manufacturing systems print fine filaments and thus can achieve desired shapes even with the existing ways of toolpath creation as shown in FIGS. 1-2. Further, due to the small size of printed objects, smaller-scale additive manufacturing does not face the challenge of low printing efficiency.

Another challenge in both large-scale and smaller-scale additive manufacturing is making overhang or bridge structures that are not subject to failures such as deformation (such as drooping) or breaking under gravity. An overhang structure, being also a type of joint structure, can include a portion of a printed structure that extends from a main part of the printed structure and into empty space in a direction at least partially orthogonal to gravity. A bridge structure can include an exemplary overhang structure having two opposing end regions each connected to a printed structure.

Inventors of the present disclosure have discovered that, although smaller-scale additive manufacturing may encounter the difficulty of making overhang structures, the difficulty is especially severe and presents unique challenges in large-scale additive manufacturing. For example, in a large-scale extrusion deposition process, an extruded bead at large scale can hold heat much longer and remain in a rubbery or molten state long after the nozzle has attempted to deposit the bead in a desired location. During solidification of the bead, the bead may not be able to maintain dimension under the weight of the bead itself and/or under the weight of material printed on top of the bead. Further, the inventors have considered using a rapid solidification process to speed up the solidification, such as spraying the bead with liquid nitrogen, but considered that the rapid solidification process may reduce inter-laminar adhesion between printed layers and weaken strength of the large-scale printed structure. In contrast, in a small-scale extrusion deposition process, fans can be used to rapidly solidify material leaving the nozzle, and overhangs can therefore be printed more easily.

The inventors have further discovered that, in a large-scale extrusion deposition process, the overhang structure is usually of large scale. For example, in printing a vehicle using large-scale additive manufacturing, it may be necessary to print structures such as fenders and raised flat planes, and printing such structures presents problems. The amount of deformation of the overhang structure can be significant. Due to the weight of an overhang structure in large-scale, breakage of the overhang structure is likely to occur. In contrast, in a smaller-scale extrusion deposition process, the overhang structure is smaller and much lighter. Accordingly, amount of deformation of the overhang structure can be very small or negligible. With a low weight, the overhang structure is less likely to break.

The inventors have further discovered that methods for making structures in smaller-scale additive manufacturing often do not apply to large-scale additive manufacturing. In one example, a support structure can be printed concurrently with the main part, and the overhang structure is subsequently printed on the support structure. However, in large-scale additive manufacturing, such a support structure costs significant resources such as material, print time, and energy consumption. Furthermore, properties of the support structure cannot be selected with flexibility, so removal of the support structure can be difficult. Even if the support structure is successfully removed without being damaged, the support structure is not reusable, resulting in large quantities of waste.

In another example, an infill structure is positioned adjacent to the main part such that the overhang structure is subsequently printed on the infill structure. The infill structure remains as a part of the printed structure and is not removed. In large-scale additive manufacturing, size of the infill structure can be large and requirements on mechanical strength of the infill structure are high, so the infill structure cannot have low density. The weight that the infill structure adds to the printed structure is also significant, sometimes making the printed structure impractical to use. The inventors have found that, even if the infill structure can be removed, print quality of the overhang structure may be unsatisfactory. For example, there can be a gap between the infill structure and the adjacent printed layers. The overhang printed over the gap may flow into the gap and can result in a shape that is not desired.

Therefore, as discovered by the inventors, for making the overhang structure, the problem in large-scale additive manufacturing is different from and/or greater than the problem in smaller-scale additive manufacturing. Further, methods for solving the problem in smaller-scale additive manufacturing may not be effective or practical in large-scale additive manufacturing.

In view of the foregoing, there is a need for improved additive manufacturing processes that have high efficiency and are capable of making joint structures in a simple manner.

Figure 1:
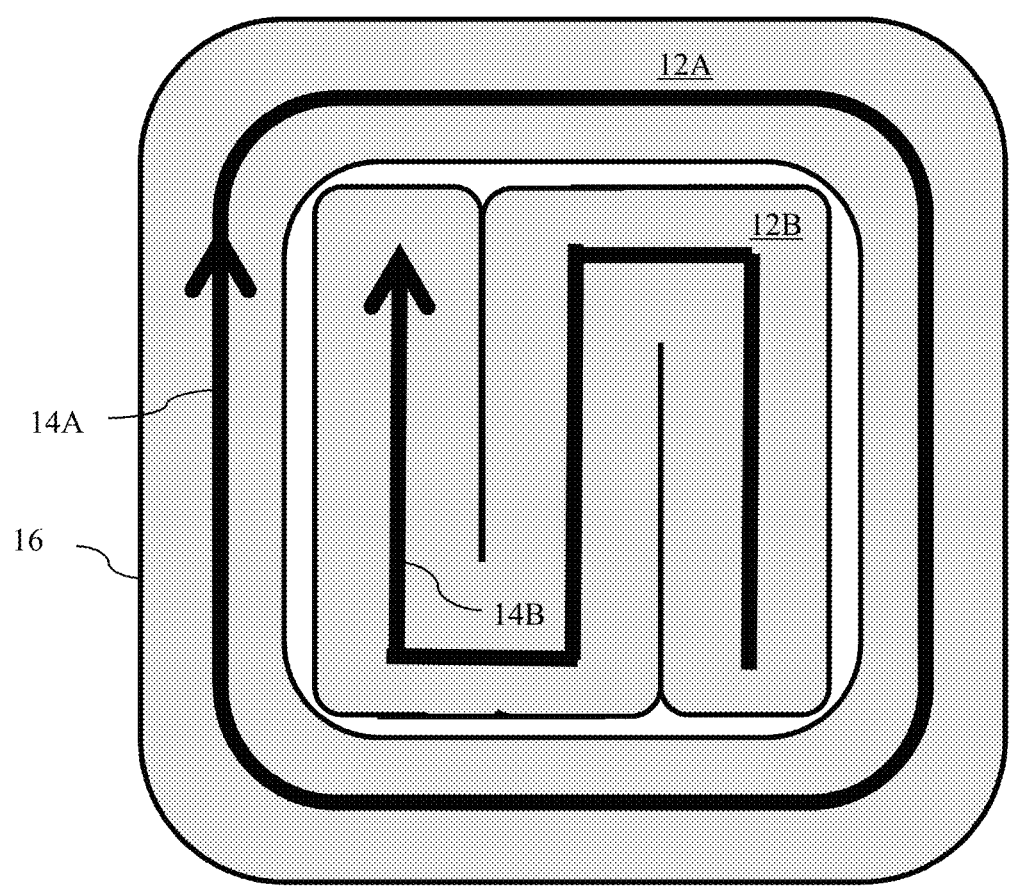
FIG. 1 is an exemplary diagram illustrating an existing structure made by additive manufacturing.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Figure 3:
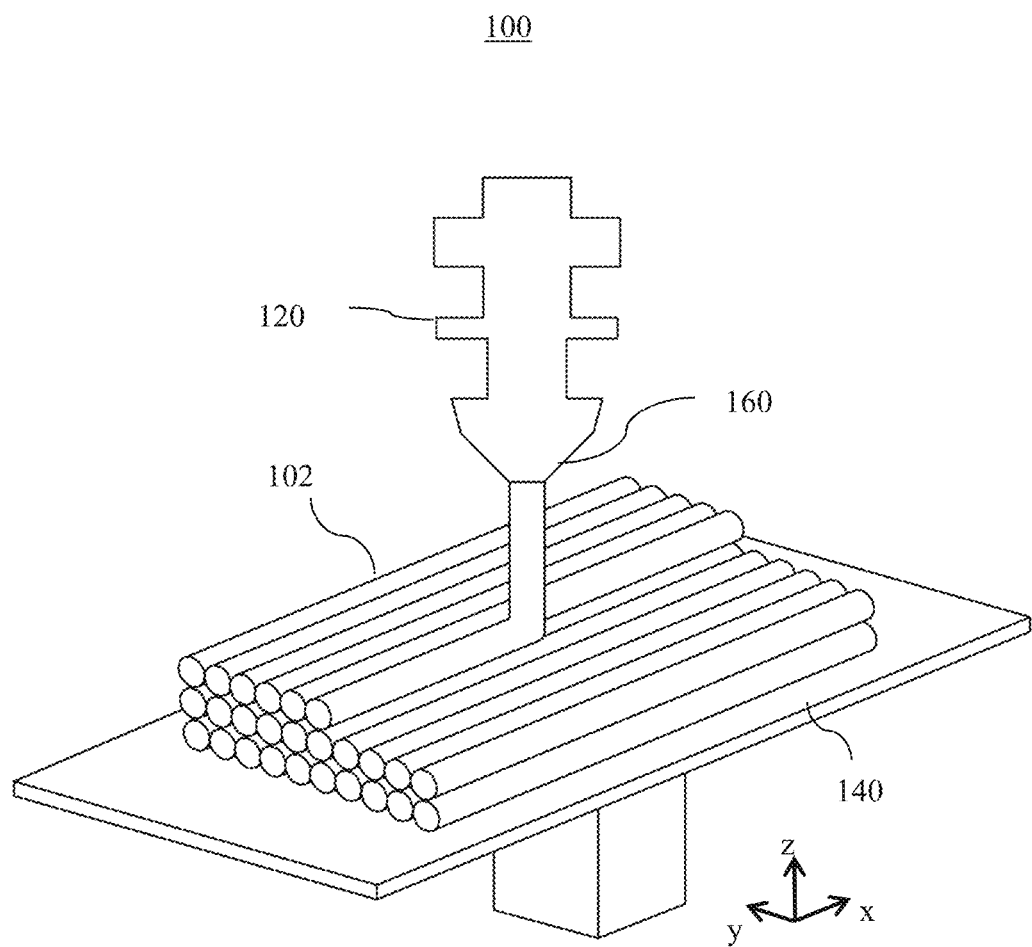
FIG. 3 is an exemplary diagram illustrating an exemplary system for additive manufacturing.

FIG. 3 shows an exemplary system 100 for additive manufacturing. The system 100 can print a 3D article 102 via extrusion deposition (or material extrusion). A print head 120 is shown as defining a nozzle 160 configured to deposit one or more polymer layers onto a print bed 140 to form the 3D printed article 102. The print bed 140 can include a heated table and/or previously deposited layers. The stacking direction of the layers is z-direction and the printing direction is x-direction.

Although FIG. 3 shows additive manufacturing as being implemented by the system 100 using extrusion deposition, any other systems or processes for implementing additive manufacturing can be used in the present disclosure. Exemplary processes for additive manufacturing can include binder jetting, directed energy deposition, material jetting, powder bed fusion, sheet lamination, vat photopolymerization, stereolithography, or a combination thereof.

Since currently-available methods and systems are incapable of printing large-scale additively manufactured parts at high efficiency or making high quality overhang structures with high quality in a simplified manner, additively manufactured structures and method for making the same for overcoming the deficiencies as set forth above can prove desirable and provide a basis for a wide range of applications, such as additive manufacturing for vehicles and/or architectural structures.

Although the structures and methods as set forth in the present disclosure are applied to solve technical problems in large-scale additive manufacturing, the structures and methods can be applied to any smaller-scale additive manufacturing, such as medium-scale and/or small-scale additive manufacturing, without limitation.

Top Level Structure 200: A Single-Bead Wall

Figure 4:
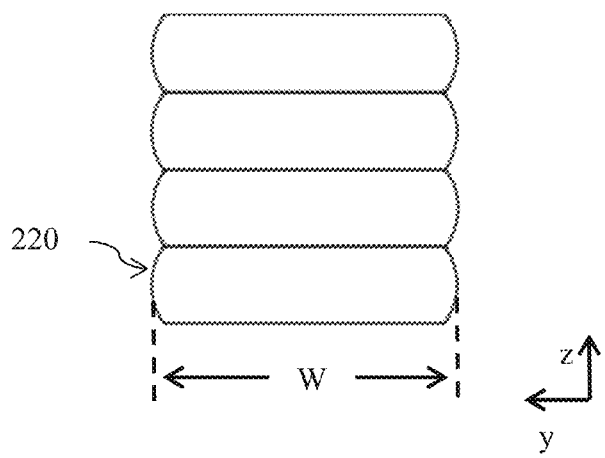
FIG. 4 is an exemplary cross-sectional diagram illustrating an embodiment of a structure made using the system of FIG. 3.

Turning to FIG. 4, a cross section of the structure 200 is shown. The structure 200 can include one or more layers 220 being stacked in the z direction. FIG. 4 shows the structure 200 as being viewed in a direction perpendicular to the z-y plane. Stated somewhat differently, FIG. 4 shows the structure 200 as being viewed in the x direction.

Each of the layers 220 is shown as having a width W. In one embodiment, the width W is the same as a selected width of a single bead, referred to as WB, that is produced by the system 100 (shown in FIG. 3). In various embodiments, a bead can include printed material laid down by the printhead 120 (shown in FIG. 3) between a start region and a subsequent stop region. Advantageously, at least a part of the layer 220 can be printed with a single bead. WB is thus the smallest width that can be achieved in a printed bead. The structure 200 thus can include a single-bead wall having a width no greater than the single-bead width WB.

Figure 5:
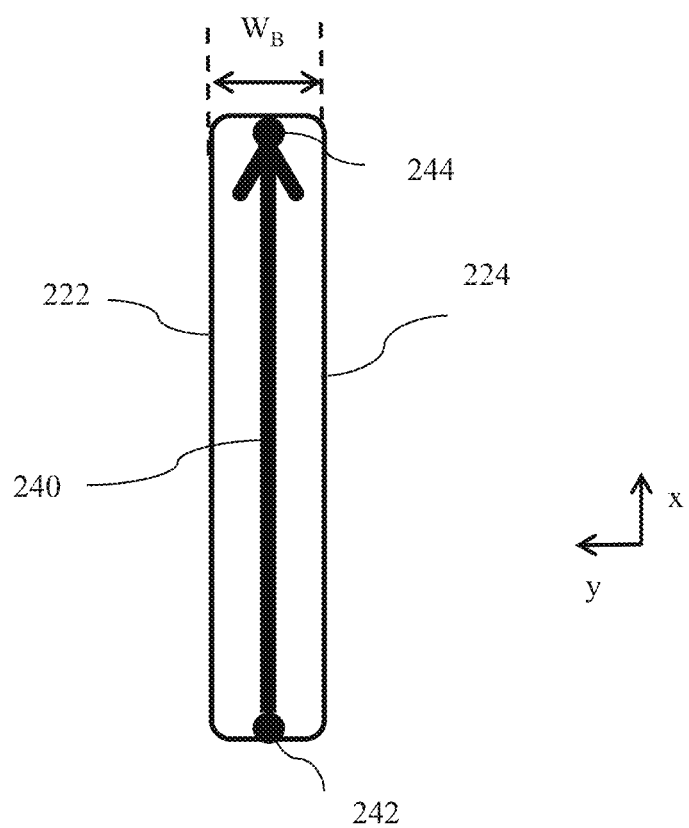
FIG. 5 is an exemplary diagram illustrating an alternative embodiment of the structure of FIG. 4, wherein a layer of the structure is shown.

Turning to FIG. 5, an exemplary layer 220 is shown in the x-y plane. The layer 220 is shown as having a width of WB. Stated somewhat differently, at least a portion of the layer 220 can have first and second peripheries 222, 224 having a distance of WB therebetween.

The layer 220 is shown as being printed according to a toolpath 240. The toolpath 240 can define a path in space that the printhead 120 (shown in FIG. 3) follows to produce the layer 220. FIG. 5 shows the toolpath 240 as including an open path progressing from a first point 242 to a second point 244 that is different from the first point 242. The toolpath 240 is shown as including a single path of travel for the printhead 120. There is not necessarily a closed-loop toolpath that encompasses the external perimeter of the shape as shown in FIG. 5. Stated somewhat differently, the external perimeter of the layer 220 can be printed with a single open-loop toolpath. Advantageously, printing efficiency can be improved. Geometry, size and/or shape of the layer 220 can be selected with less limitation.

Although the toolpath 240 is shown in FIG. 5 as including a straight line, the toolpath 240 can include additional and/or alternative segments that have uniform and/or different sizes, lengths, shapes, dimensions, or a combination thereof, without limitation. The toolpath 240 can include a curve, a straight line, a polyline, a zigzag, and/or other suitable shapes, without limitation.

Figure 6:
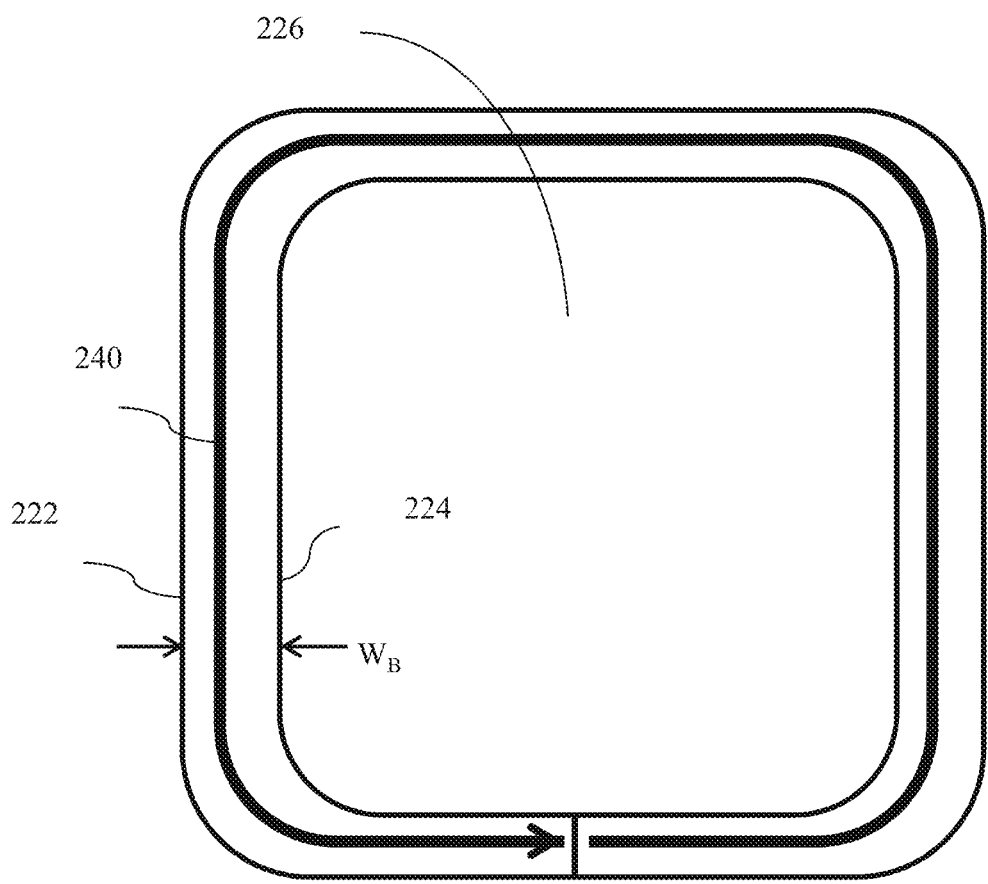
FIG. 6 is an exemplary diagram illustrating another alternative embodiment of the layer of FIG. 4, wherein a layer of the structure is shown as defining a void.

Turning to FIG. 6, another exemplary layer 220 is shown in the x-y plane. The layer 220 is shown as defining a void 226. The layer 220 is shown as having a width of WB. Stated somewhat differently, at least a portion of the layer 220 can have the first and second peripheries 222, 224 having a distance of WB therebetween.

The layer 220 is shown as being printed according to the toolpath 240. The toolpath 240 is shown as including a single path of travel for the printhead 120. The toolpath 240 is shown as being a closed path. Stated somewhat differently, the toolpath 240 can form a closed loop. The structure 200 thus can include a single-bead closed wall having a width no greater than the single-bead width WB. The first and second peripheries 222, 224 can thus have a distance therebetween that is smaller than a lower limit permitted by conventional toolpath creation. Such toolpath 240 cannot be defined by existing slicing software and thus the layer 220 shown in FIG. 6 cannot be printed in accordance with the slicing result. To print the structure as shown in FIG. 6 with existing slicing software, a solid pattern (shown in FIG. 1) needs to be drawn and the slicing software needs to be configured such that one perimeter bead (such as the bead 12A shown in FIG. 1) is printed and no infill is added inside the bead 12A.

However, the slicing software as disclosed in the present disclosure is capable of defining the toolpath 240 with great flexibility. The toolpath 240, and the bead formed accordingly, can be a single open loop. The slicing software is capable of forming a single closed loop where start and end regions of a single open loop can connect. Thus, the layer 220 shown in FIG. 6 can be printed in accordance with the slicing result without the complexity as set forth above.

Top Level Structure 200: A Joint Section 201 that Connects to a Side Wall of the Main Wall Section 260

Figure 7:
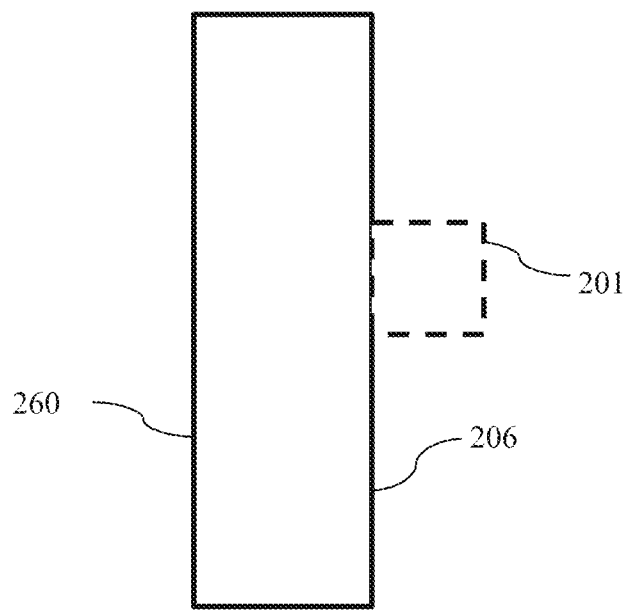
FIG. 7 is an exemplary diagram illustrating an alternative embodiment of the structure of FIG. 4, wherein the structure includes a joint section.

Turning to FIG. 7, an exemplary structure 200 is shown. The structure 200 is shown as including a main wall section 260. The main wall section 260 can have any shape that can provide a side wall 206. The structure 200 is further shown as including a joint section 201 connected to the main wall section 260 at the side wall 206.

The joint section 201 can be used for connecting the main wall section 260 to another structure, and/or for branching out from the main wall section 260 to result in additional functionality and/or appearance. The joint section 201 can have a width that is, in at least one dimension, no greater than the single-bead width WB.

Figure 12:
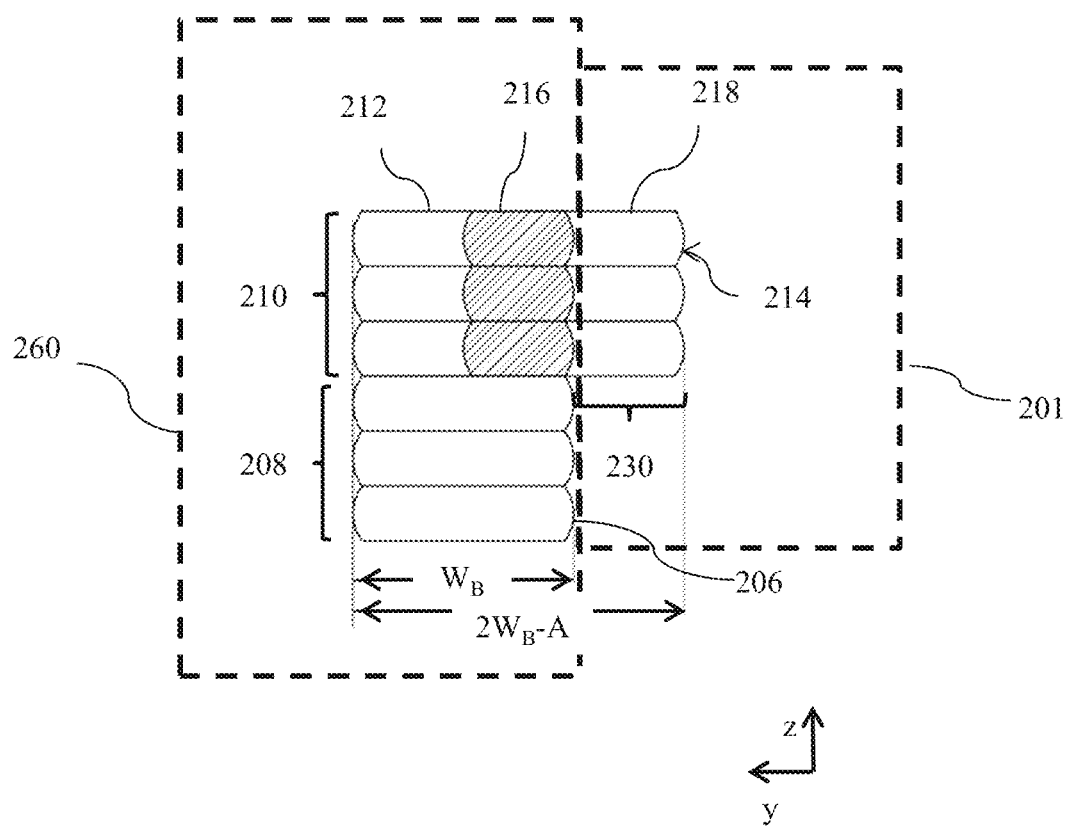
FIG. 12 is an exemplary cross-sectional diagram illustrating an alternative embodiment of the structure of FIG. 10, wherein the structure includes a junction overhang section.

In some embodiments, as illustrated in FIGS. 12 and 14, the joint section 201 can extend parallel to, while overhanging beyond, the side wall 206. The width of the joint section 201 can be measured perpendicular to the side wall 206 and be defined by a distance of the joint section 201 overhanging beyond the side wall 206.

Figure 22:
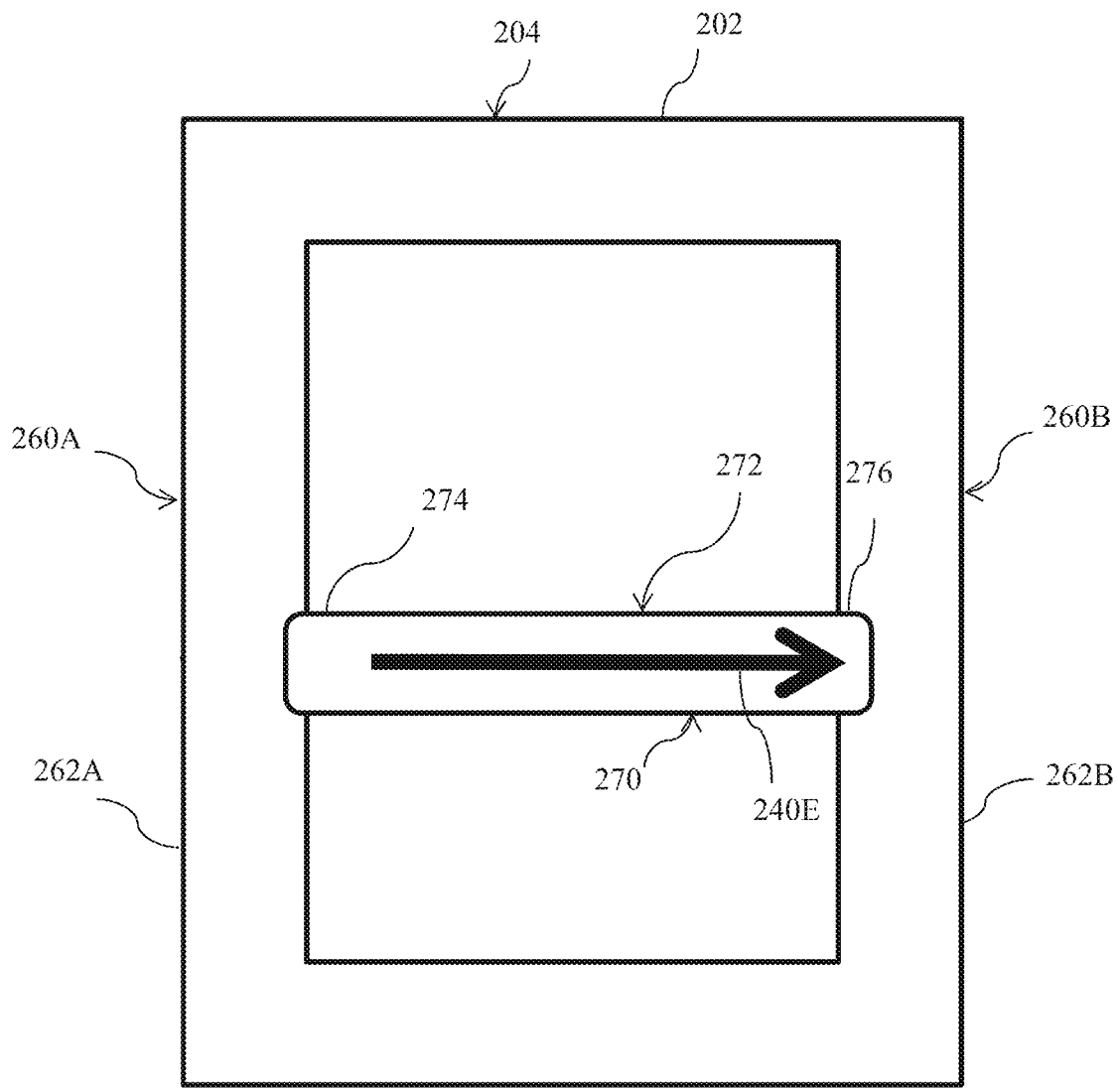
FIG. 22 is an exemplary diagram illustrating an alternative embodiment of the structure of FIG. 18, wherein the toolpath defining the structure travels distally from a first main wall section.

In other embodiments, as illustrated in FIGS. 16 and 22, the joint section 201 can extend at least partially in a direction non-parallel to the side wall 206. The width of the joint section 201 can be defined by a distance between opposing side walls of the joint section 201.

Method for Making the Top Level Structure 200

Figure 8:
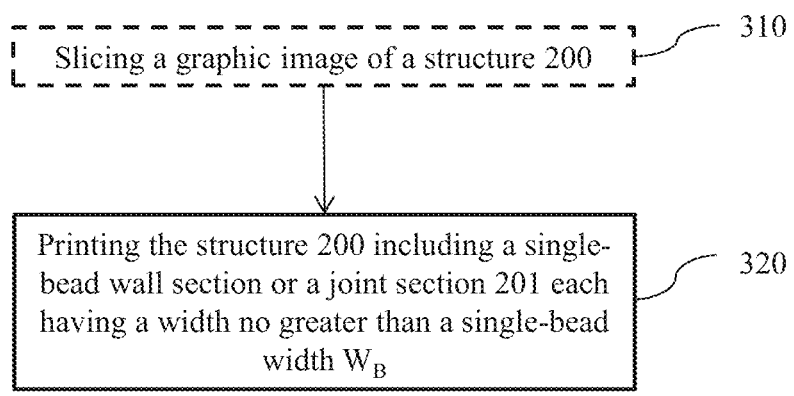
FIG. 8 is an exemplary top-level flow chart illustrating an embodiment of a method for additive manufacturing based on the system of FIG. 3.

Turning to FIG. 8, an exemplary method 300 of making the structure 200 (shown in FIG. 4) is shown. A graphic image (not shown) of the structure 200 can optionally be sliced, at 310. The graphic image can be sliced into a plurality of layers 220 (shown in FIG. 4) stacked in the stacking direction. The plurality of layers 220 can each be defined via one or more toolpaths 240 (shown in FIG. 5) based on a selected single-bead width WB.

The structure 200 can be printed, at 320, based on the slicing. The structure 200 can include the single-bead wall as shown in FIG. 4. Additionally and/or alternatively, the structure 200 can include the joint section 201.

Embodiments Setting Forth Joint Section 201

The following embodiments of the structure 200 are described below and illustrated in drawings. In various embodiments, a "layer" can have a planar pattern in x-y plane. One or more beads can be printed within the layer according to respective toolpaths. One bead can form one or more "segments" within the layer. In a plurality of stacked layers, each layer can have a segment that is spatially related to a corresponding segment in an adjacent layer. Such corresponding segments of the stacked layers can collectively form a "section" that is a part of the structure 200 and has specific structural function or characteristics.

Joint Section 201 Joining The Main Wall Section 260 As Viewed In The Z-Y Plane.

In the following description, the joint section 201 is set forth as being a branch being extended farther away from the main wall section 260 as more layers 220 are formed.

Figure 9A:
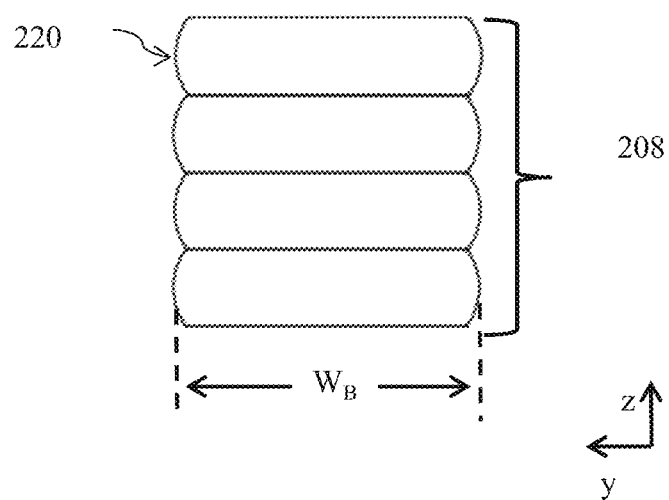
FIG. 9A is an exemplary cross-sectional diagram illustrating an alternative embodiment of the structure of FIG. 4, wherein the structure includes a main wall section.
Figure 9B:
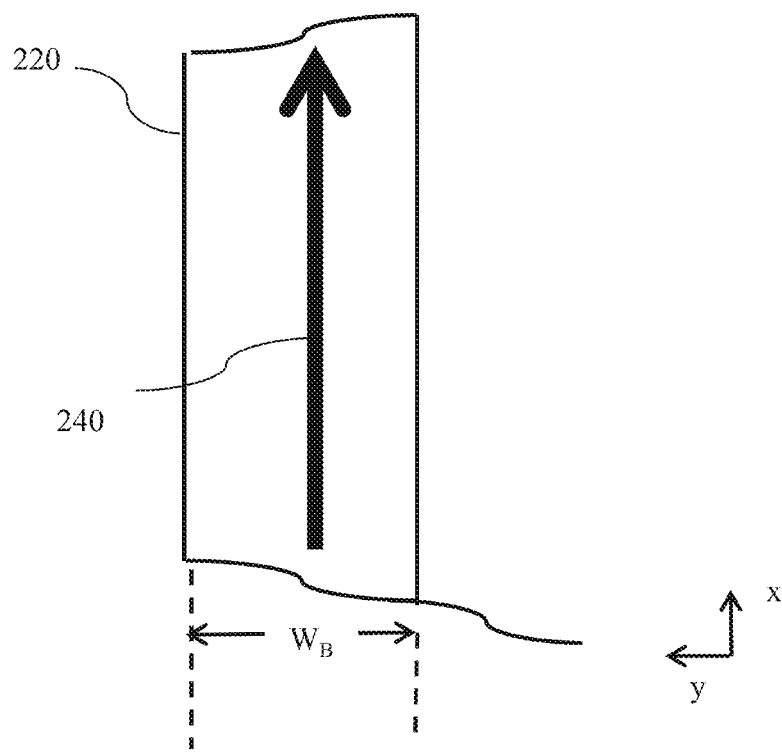
FIG. 9B is an exemplary diagram illustrating the structure of FIG. 9A, wherein a layer of the main wall section is shown.

Turning to FIG. 9A, the structure 200 is shown as including a base section 208. The base section 208 can include any structure for receiving printed materials. As illustrated in FIG. 9A, an exemplary base section 208 can include a plurality of layers 220 stacked in the z direction. In one embodiment, each layer 220 can be printed using a single bead and/or using a single toolpath 240 (shown in FIG. 9B). The layers 220 are shown as stacking to collectively form the base section 208. The base section 208 is shown as having a width equal to WB. Stated somewhat differently, the base section 208 can have a shape of a wall with a thickness of WB.

Although FIG. 9A shows four layers 220 for illustrative purposes only, the base section 208 can include one or more uniform and/or different layers 220, without limitation. Although FIG. 9A shows the width of the layers 220 as equal to WB, the base section 208 can be formed with more than one bead (arranged in parallel, for example) in each layer 220, and thus can have different and/or uniform width that is greater than WB. Stated somewhat differently, the base section 208 can have varying thicknesses depending on the number of beads, toolpaths, or the spatial arrangement thereof, in each layer.

Figure 9C:
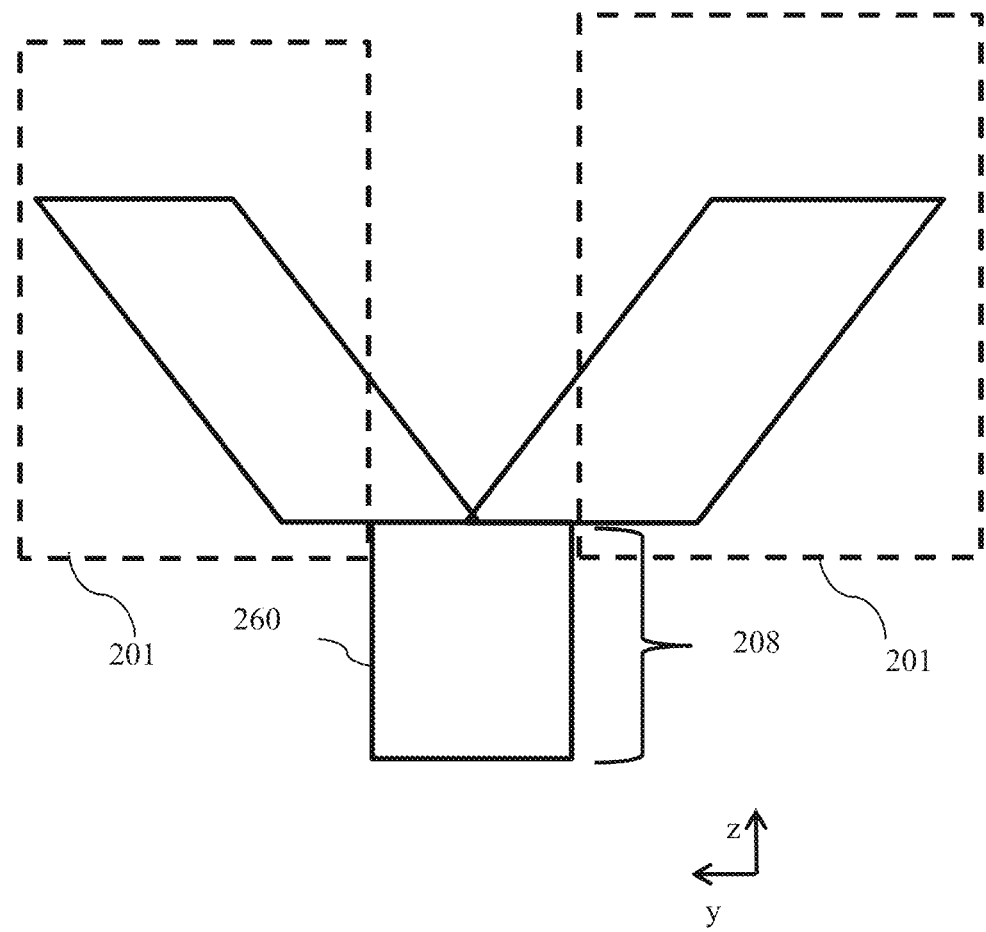
FIG. 9C is an exemplary cross-sectional diagram illustrating an alternative embodiment of the structure of FIG. 7, wherein the structure includes two joint sections.

Turning to FIG. 9C, the base section 208 is shown as functioning as the main wall section 260. Two joint sections 201 are shown as branching out from, and overhanging beyond, the main wall section 260. Stated somewhat differently, the structure 200 can have a Y shape. Advantageously, the main wall section 260 can thus branch into two walls to provide added functionality or desired look to the structure 200.

Although FIG. 9C shows the structure 200 as including two symmetrical joint sections 201 branching from the main wall section 260 at the same length and angle for illustrative purposes only, the structure 200 can include one or more joint sections 201 branching out at any suitable uniform and/or different lengths, angles, geometry shape, symmetry, without limitation.

Figure 9D:
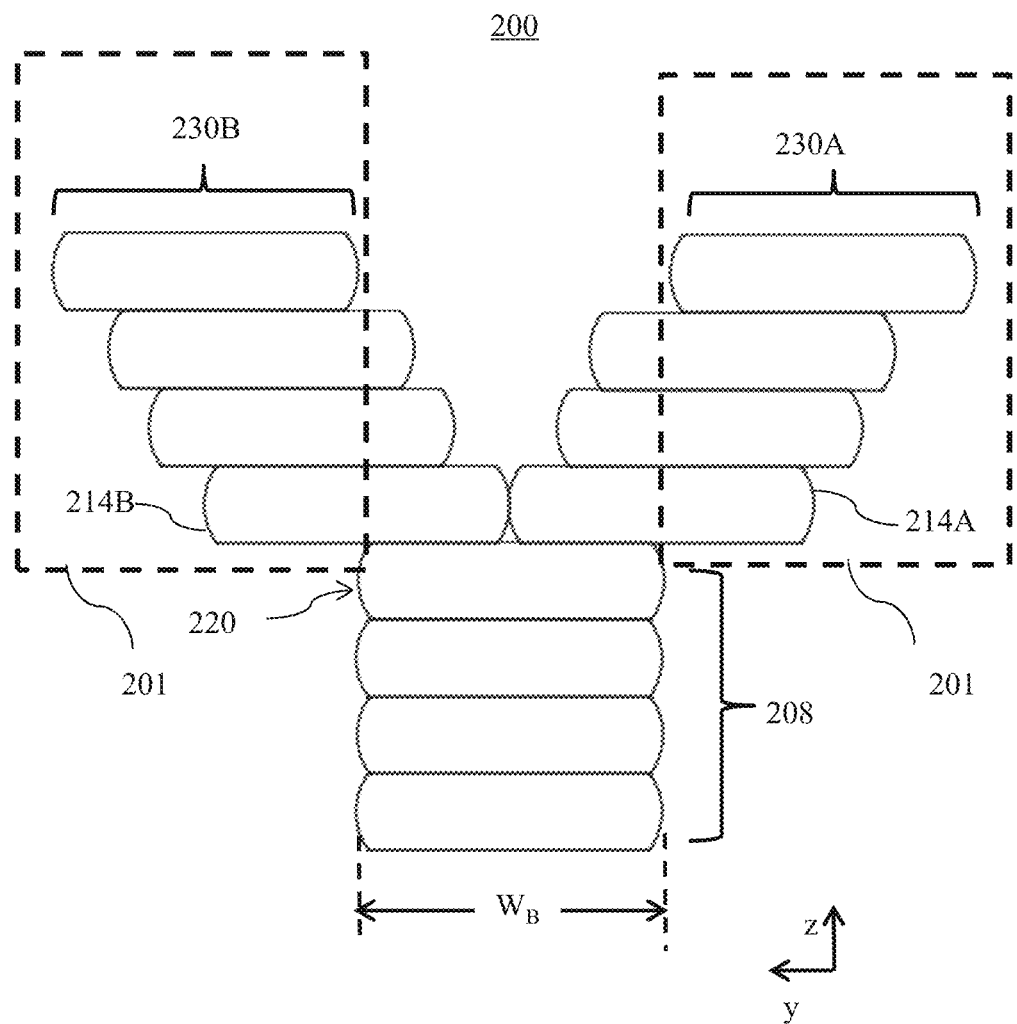
FIG. 9D is an exemplary cross-sectional diagram illustrating an alternative embodiment of the structure of FIG. 9C, wherein each joint section includes one or more branch segments.

Turning to FIG. 9D, the structure 200 is shown as including a plurality of layers 220 each including junction segments 214A, 214B. The portion of the junction segments 214A, 214B overhanging beyond the base section 208 can form junction overhang sections 230A, 230B, respectively. The junction segments 214A, 214B of each layer 220 are positioned at a selected distance and the distance is shown as increasing along the z direction.

Although FIG. 9D shows the main wall section 260 and the junction segments 214A, 214B as having a single-bead width for illustrative purposes only, the main wall section 260 and the junction segments 214A, 214B can have any selected width, length, geometry and shape, without limitation. Although FIG. 9D shows the layers 220 as having non-overlapping segments for illustrative purposes only, the structure 200 can include one or more layers 220 as including segments that overlap by uniform and/or different amounts, without limitation.

Figure 9E:
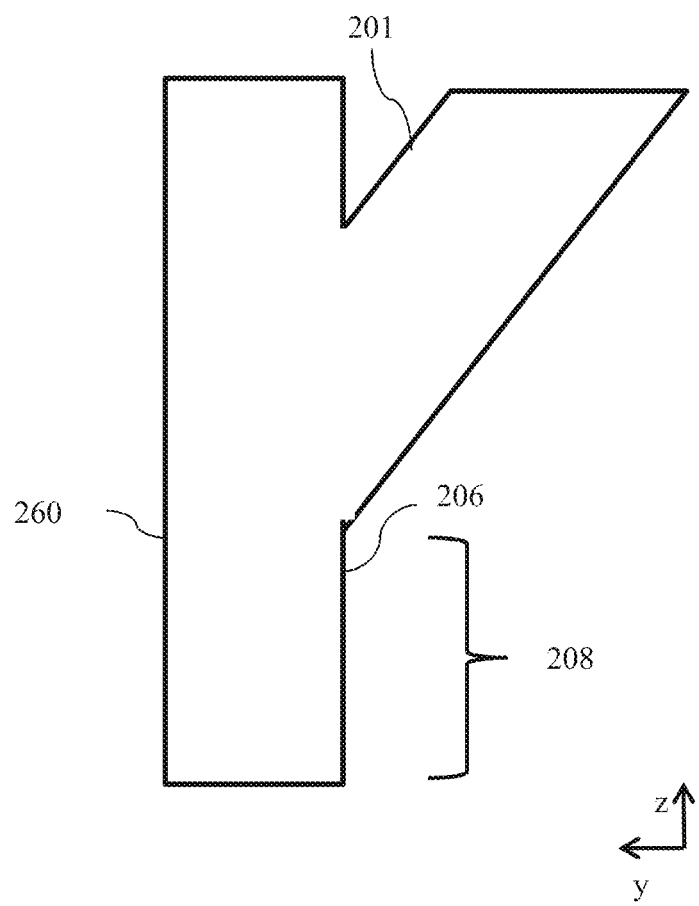
FIG. 9E is an exemplary cross-sectional diagram illustrating another alternative embodiment of the structure of FIG. 7, wherein the structure includes one joint section.

Turning to FIG. 9E, the base section 208 is shown as functioning as a part of the main wall section 260, while the main wall section 260 extends further in the z direction. One joint section 201 is shown as branching out from, and overhanging beyond, the main wall section 260. Advantageously, the main wall section 260 can thus branch into two walls to provide added functionality or desired look to the structure 200. The structure 200 can be made via laying beads in various ways. Exemplary structure 200 are further illustrated in, for example, FIGS. 14A-14C.

Although FIG. 9E shows the main wall section 260 and the base section 208 as being straight along z direction for illustrative purposes only, the sidewall 206 of the main wall section 260 and/or the base section 208 can include a straight line, a polyline, a curve, a spline, or a combination thereof, without limitation.

Figure 10:
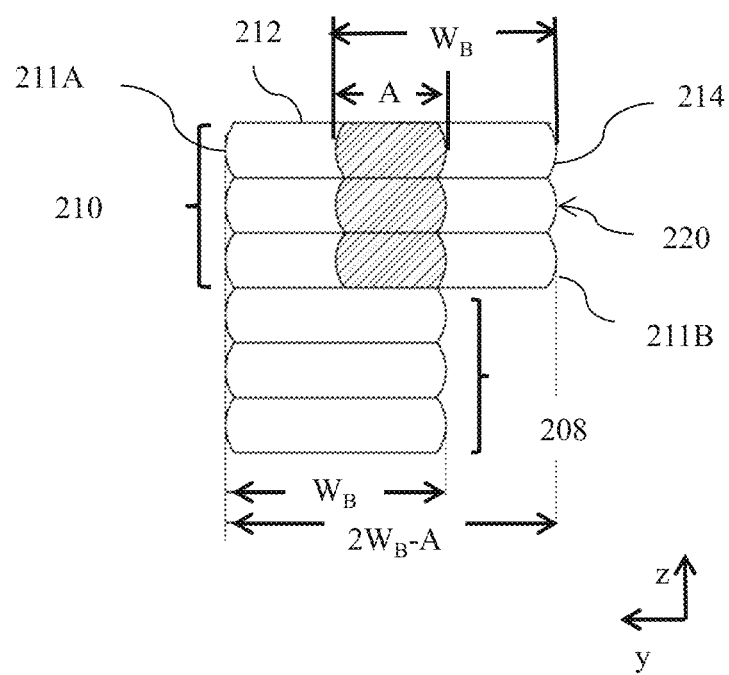
FIG. 10 is an exemplary cross-sectional diagram illustrating an alternative embodiment of the structure of FIG. 9A, wherein the structure includes a linking section.

Turning to FIG. 10, the structure 200 is shown as further including a plurality of layers 220 stacked in the z direction. The layers 220 are shown as each including a linking segment 212 and a junction segment 214 that is at least partially overlapped with the linking segment 212 by an overlapping amount A. The overlapping amount A can be a selected percentage (or overlapping percentage) of the single bead width WB.

The linking segment 212 is shown as having the width WB. In one embodiment, the linking segment 212 can be printed using a single bead and/or using a single toolpath 240A (shown in FIG. 11A). The junction segment 214 is shown as having the width WB. In one embodiment, the junction segment 214 can be printed using a single bead and/or using a single toolpath 240B (shown in FIG. 11A).

The linking segment 212 being stacked can collectively form a linking section 210. The linking section 210 is shown as being stacked on a base section 208.

Figure 11A:
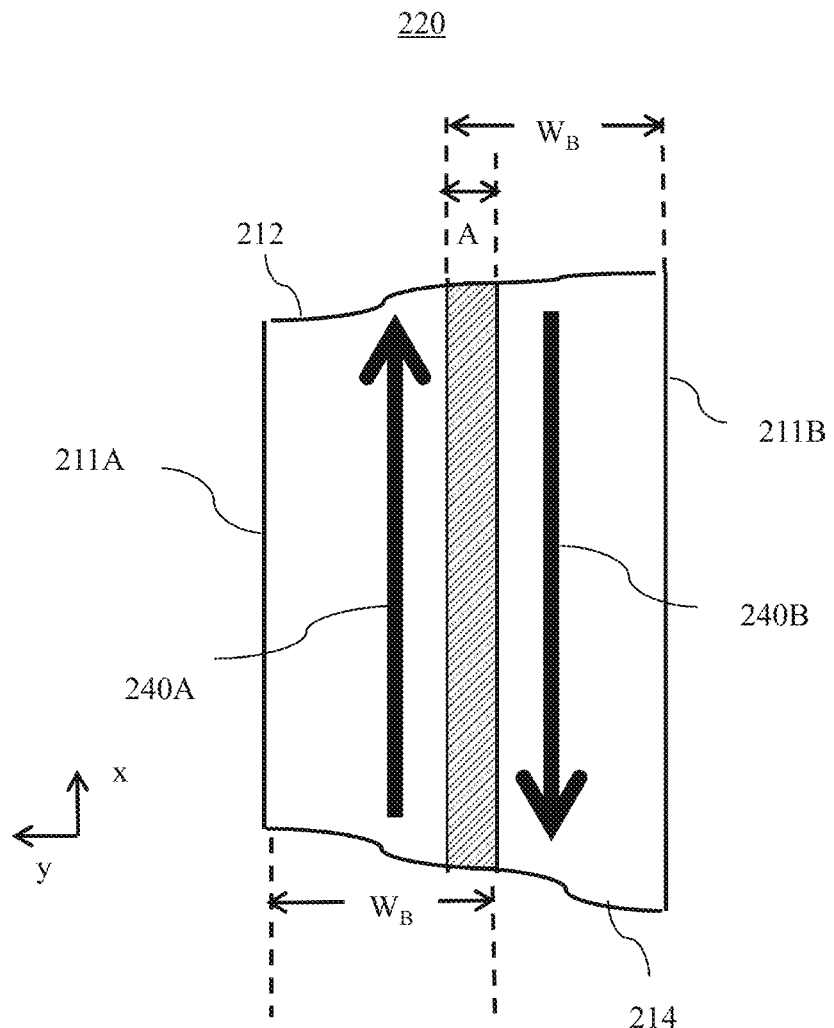
FIG. 11A is an exemplary diagram illustrating the structure of FIG. 10, wherein a layer of the linking section is shown.

Turning to FIG. 11A, an exemplary layer 220 is shown in the x-y plane. The layer 220 is shown as including the linking segment 212 and the junction segment 214 each having a width of WB. The linking segment 212 and the junction segment 214 are shown as being printed according to toolpaths 240A, 240B, respectively. The toolpaths 240A, 240B are shown as being parallel and being arranged such that the linking segment 212 and the junction segment 214 are overlapped by an overlap amount A. A can be greater than zero and smaller than WB. Stated somewhat differently, the linking segment 212 and the junction segment 214 are overlapped by an overlap percentage. The overlap percentage can be equal to (A/WB)×100%.

The overlapping percentage can be controlled in any suitable manner. In one embodiment, the shape of the layer 220 can be defined in computer-aided manufacturing (CAM) program. The CAM program can include any suitable computer program that can process a graphical image of the structure 200 (shown in FIG. 4) and determine toolpaths of the printhead 120 (shown in FIG. 3) for printing the structure 200. In the CAM program, shapes (for example, lines, surfaces, planes, and/or the like) corresponding to the linking segment 212 and the junction segment 214 can be drawn to have a size therebetween that is smaller than 2 WB and greater than WB. For examples, surfaces corresponding to two opposite external surfaces 211A, 211B (shown in FIG. 10) of the structure 200 (shown in FIG. 10) can be defined. The external surfaces 211A, 211B can respectively define one external surface of the linking section 210 and one external surface of the junction overhang section 230 (shown in FIG. 12). The external surfaces 211A, 211B can have a distance therebetween that is smaller than 2 WB and greater than WB. Thus, slicing software can generate toolpaths that result in overlapping beads.

Exemplary CAM programs can include Mastercam, available from CNC Software, Inc. located in Tolland, Conn. CAM slicing software can convert the drawn shapes into corresponding beads that overlap. Exemplary CAM slicing software can include LSAM Print 3D available from Thermwood Corporation. Optionally, the shape of the layer 220 can be defined in a computer-aided design (CAD) program and imported into the CAM program, such that the CAM program can create features (for example, lines, surfaces, planes, and/or the like) that are derived from the imported CAD-defined shapes. Exemplary CAD programs can include NX, available from Cam Logic, Inc. located in Oxford, Mich.

Figure 11B:
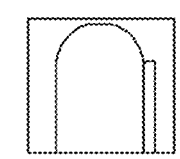
FIG. 11B is an exemplary user interface illustrating control of overlapping in the structure of FIG. 11A.

In another embodiment, when the shape of the layer 220 is being defined in the CAM program, instructions can be inputted in the CAM slicing software for overlapping the linking segment 212 and the junction segment 214 by a selected overlap percentage. In an exemplary user interface 600 (shown in FIG. 11B) provided by LSAM Print 3D, input controls 620 can be used for setting overlapping percentage or distance between adjacent beads.

In yet another embodiment, when the shape of the layer 220 is being defined in the CAD and/or CAM program, the linking segment 212 and the junction segment 214 can be defined to have no overlap, and/or to have overlap by a selected overlap percentage, based on an assumption of a nominal bead width. During printing, a pump rate of the printed material from the printhead 120 (shown in FIG. 3) can be adjusted at selected positions of a bead. The selected width of the bead can be different from the nominal bead width. Increasing the pump rate can increase the width of the bead and decreasing the pump rate can decrease the width of the bead. For example, even if the linking segment 212 and the junction segment 214 are defined as non-overlapping in the CAD and/or CAM program, the linking segment 212 and the junction segment 214 can overlap when the pump rate is increased to produce a bead width greater than the nominal bead width. In one example, the change in pump rate can be implemented by modifying G-code associated with the system 100.

Additionally and/or alternatively, changing a gantry speed and/or feed rate associated with the printhead 120 can result in a change of the width of the bead. Even if the pump rate remains constant, decreasing the gantry speed and/or feed rate can increase the width of the bead and increasing the pump rate can decrease the width of the bead. In one example, the change in gantry speed and/or feed rate can be implemented by modifying G-code associated with the system 100.

Optionally, the linking segment 212 and the junction segment 214 can be printed using the same bead. Stated somewhat differently, the toolpaths 240A, 240B can be connected into one toolpath 240. For example, a bead can traverse the toolpath 240A, perform a U-turn, and traverse the toolpath 240B. As a result, the system 100 does not need to switch to a new toolpath or new bead between printing of the linking segment 212 and printing of the junction segment 214.

Although FIG. 11A shows the toolpaths 240A, 240B as being in opposite directions for illustrative purposes only, the toolpaths 240A, 240B can be in the same direction, without limitation. Although FIG. 11A shows the toolpaths 240A, 240B as being parallel for illustrative purposes only, the toolpaths 240A, 240B can be at least partially non-parallel, without limitation.

Turning to FIG. 12, the junction segment 214 is shown as including an overlap portion 216 that overlaps with the linking segment 212 and a non-overlap portion 218 that does not overlap with the linking segment 212. As a result of gravity, the unsupported portion of the junction segment 214 can droop against the z direction. Advantageously, a total thickness of the linking segment 212 and the overlap portion 216 can be similar to, and/or not significantly greater than, the thickness of a single bead.

The non-overlap portion 218 at the bottom of the junction overhang section 230 is suspended without any support during printing and thus may roll over or droop downward to a certain degree. However, when more layers 220 are stacked, additional non-overlap portions 218 can, under support of previously-printed non-overlap portion 218, recover the planar geometry as printed and maintain such geometry.

FIG. 12 shows the non-overlap portions 218 collectively form a junction overhang section 230 that extends beyond the base section 208 and suspends without being supported along the z direction. Advantageously, the junction overhang section 230 can be formed without the need of any infill or support structure. The printing process can thus be simplified. Furthermore, the junction overhang section 230 can be formed accurately in an easy manner without a need of accurate positioning of the infill or support structure. The joint section 201 is shown as including the junction overhang section 230. The main wall section 260 is shown as including the base section 208 and the linking section 210.

Figure 13:
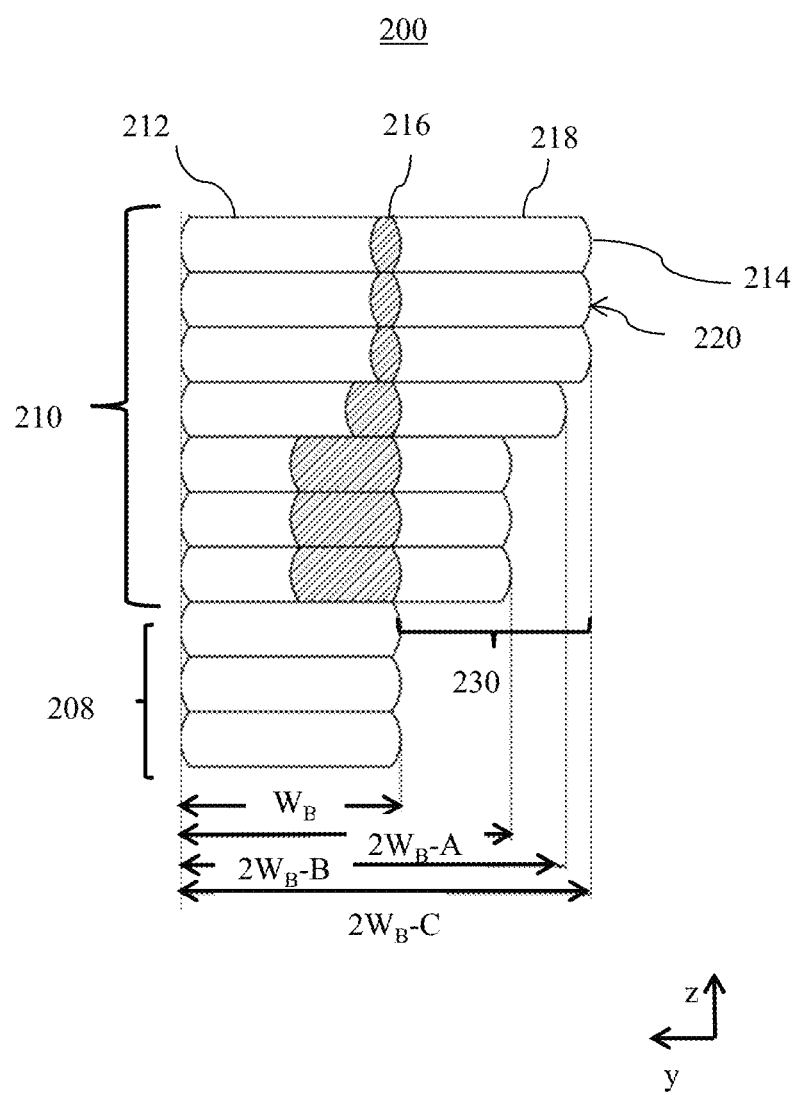
FIG. 13 is an exemplary cross-sectional diagram illustrating another alternative embodiment of the structure of FIG. 10, wherein the linking section is associated with a plurality of overlap amounts.

Turning to FIG. 13, the structure 200 is shown as including a plurality of layers 220 stacked in the z direction. The layers 220 are shown as each including the linking segment 212 and the junction segment 214 that is at least partially overlapped with the linking segment 212 by a selected overlapping amount.

The overlapping amount is shown as being A for the three layers 220 proximal to the base section 208, being C for the three layers 220 distal from the base section 208, and being B for the layer 220 in between. FIG. 13 shows that A>B>C. Stated somewhat differently, the overlapping amount and/or overlapping percentage decreases in the z direction. As a result, extension of the junction overhang section 230 beyond the base section 208 can increase in the z direction. Advantageously, the junction overhang section 230 can become large enough for usage purposes while maintain strong connection with the linking section 210. A, B and C can be any suitable values. Exemplary A, B and C can range from 0.1 WB to 0.6 WB. In one non-limiting example, A, B and C can be 0.5 WB, 0.25 WB and 0.14 WB, respectively.

Although FIG. 13 shows three layers 220, one layer 220 and three layers 220 as being respectively associated with the overlap amount A, B and C for illustrative purposes only, any uniform and/or different numbers of layers 220 can be associated with each of the overlap amount, without limitation. Further, although FIG. 13 shows the overlap amount A, B and C for illustrative purposes only, the linking section 210 can have one selected overlap amount, or any number of selected overlap amounts, without limitation.

Figure 14A:
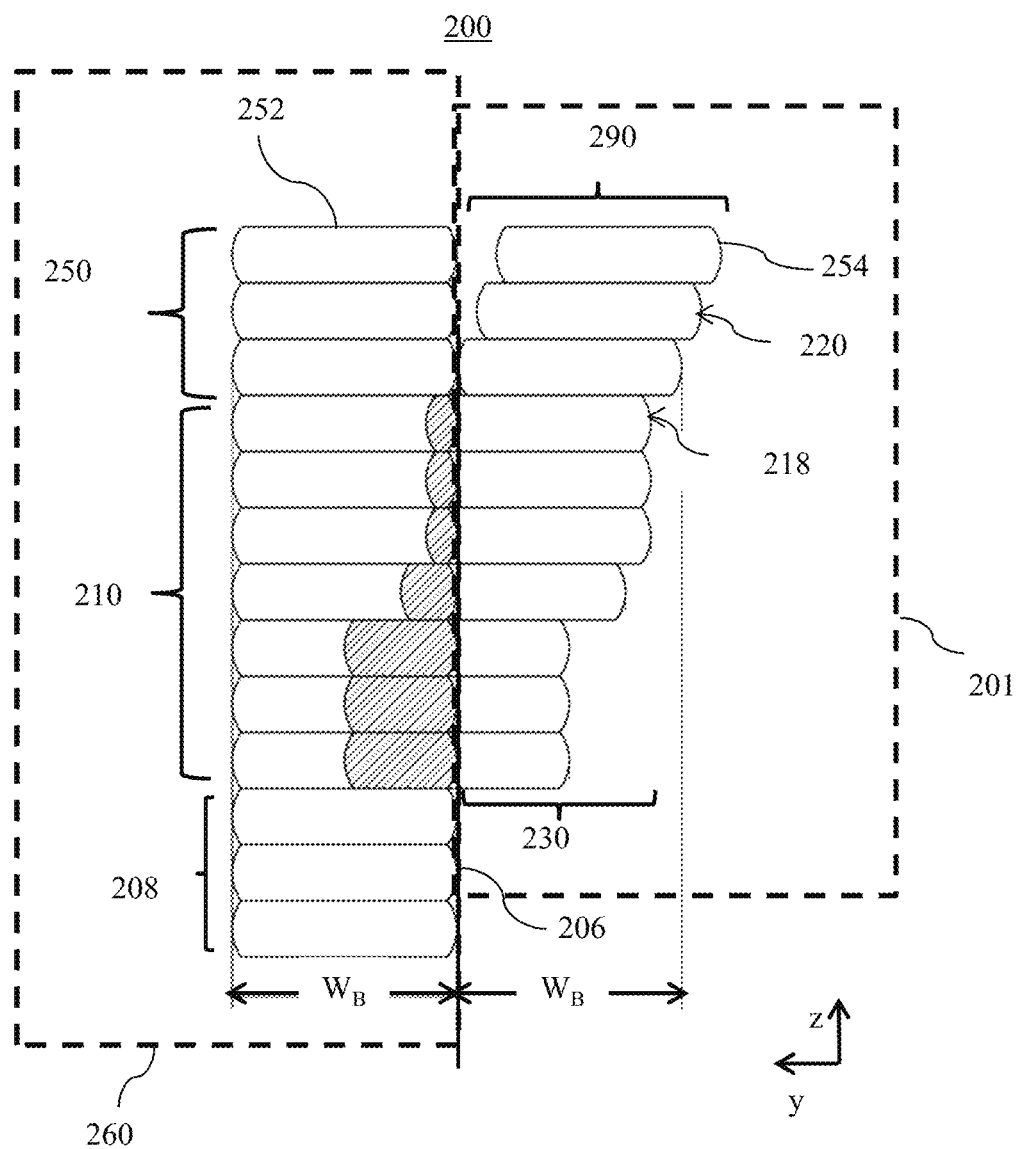
FIG. 14A is an exemplary cross-sectional diagram illustrating an alternative embodiment of the structure of FIG. 10, wherein the structure includes a continuing section.

Turning to FIG. 14A, the structure 200 is shown as further including a plurality of layers 220 stacked in the z direction. The layers 220 are shown as each including a continuing segment 252 and a branch segment 254 that is not overlapped with the continuing segment 252.

The continuing segment 252 is shown as having a width equal to WB. In one embodiment, the continuing segment 252 can be printed using a single bead and/or using the single toolpath 240A (shown in FIG. 15). The branch segment 254 is shown as having a width equal to WB. In one embodiment, the branch segment 254 can be printed using a single bead and/or using a single toolpath 240C (shown in FIG. 15).

The continuing segments 252 are shown as being stacked to collectively form an optional continuing section 250. The continuing section 250 is shown as being stacked on the linking section 210. FIG. 14A shows the branch segments 254 as at least partially stacked to collectively form a branch overhang section 290 that at least partially stacks on the junction overhang section 230 and connects to the linking section 210 via the junction overhang section 230. The joint section 201 is shown as including the junction overhang section 230 and the branch overhang section 290. The main wall section 260 is shown as including the base section 208, the linking section 210 and the continuing section 250.

Although FIG. 14A shows the structure 200 as including both the continuing section 250 and the branch overhang section 290 for illustrative purposes only, the continuing section 250 and the branch overhang section 290 are both optional. For example, the structure 200 can include the continuing section 250 but not the branch overhang section 290. The junction overhang section 230 can thus function as a mounting location for shelves, brackets, or the like. In another example, the structure 200 can include the branch overhang section 290 but not the continuing section 250. Although FIG. 14A shows the continuing section 250 and the branch overhang section 290 have the same thickness (or including the same number of stacked beads) for illustrative purposes only, the continuing section 250 and the branch overhang section 290 can have different thickness or include different number of stacked beads, without limitation.

Figure 14B:
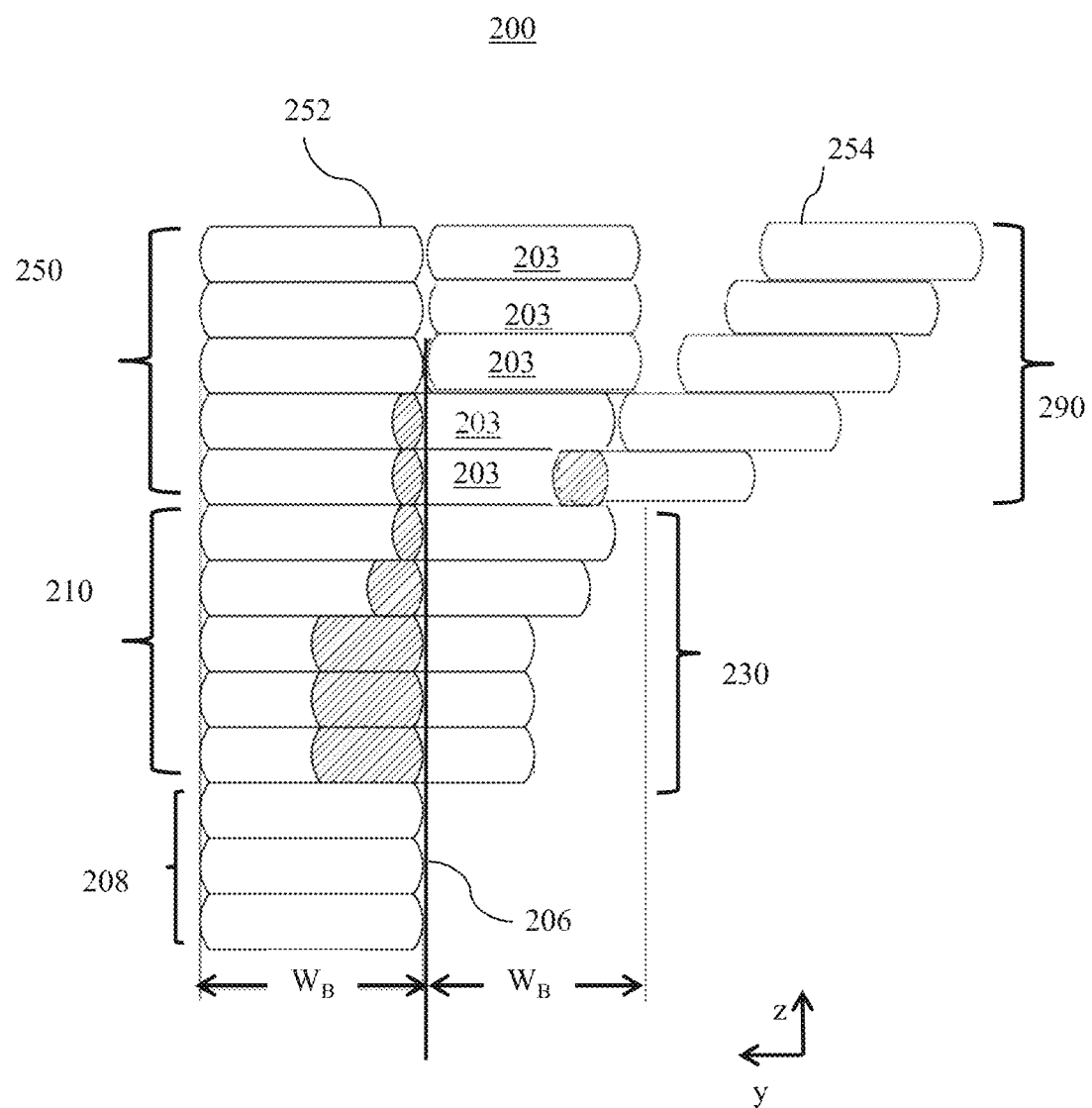
FIG. 14B is an exemplary cross-sectional diagram illustrating an alternative embodiment of the structure of FIG. 14A, wherein the structure includes one or more medium segments adjacent to the continuing section.

Turning to FIG. 14B, the structure 200 is shown as including a medium segment 203 located between the branch segment 254 and the continuing segment 252. One medium segment 203 is shown as overlapping with both of the branch segment 254 and the continuing segment 252. One medium segment 203 is shown as overlapping with the continuing segment 252 but not with the branch segment 254. Each of the three medium segments 203 at the top are shown as being adjacent to the continuing segment 252 and at a distance from the branch segment 254. Being adjacent to the continuing segment 252 can include being in contact, but without overlapping, with the continuing segment 252.

Advantageously, the medium segment 203 can provide expansion to top area of the continuing section 250. By overlapping with at least one branch segment 254, the medium segment 203 can strengthen the overhang section 290 that extends beyond the continuing section 250 by a significant amount.

Figure 14C:
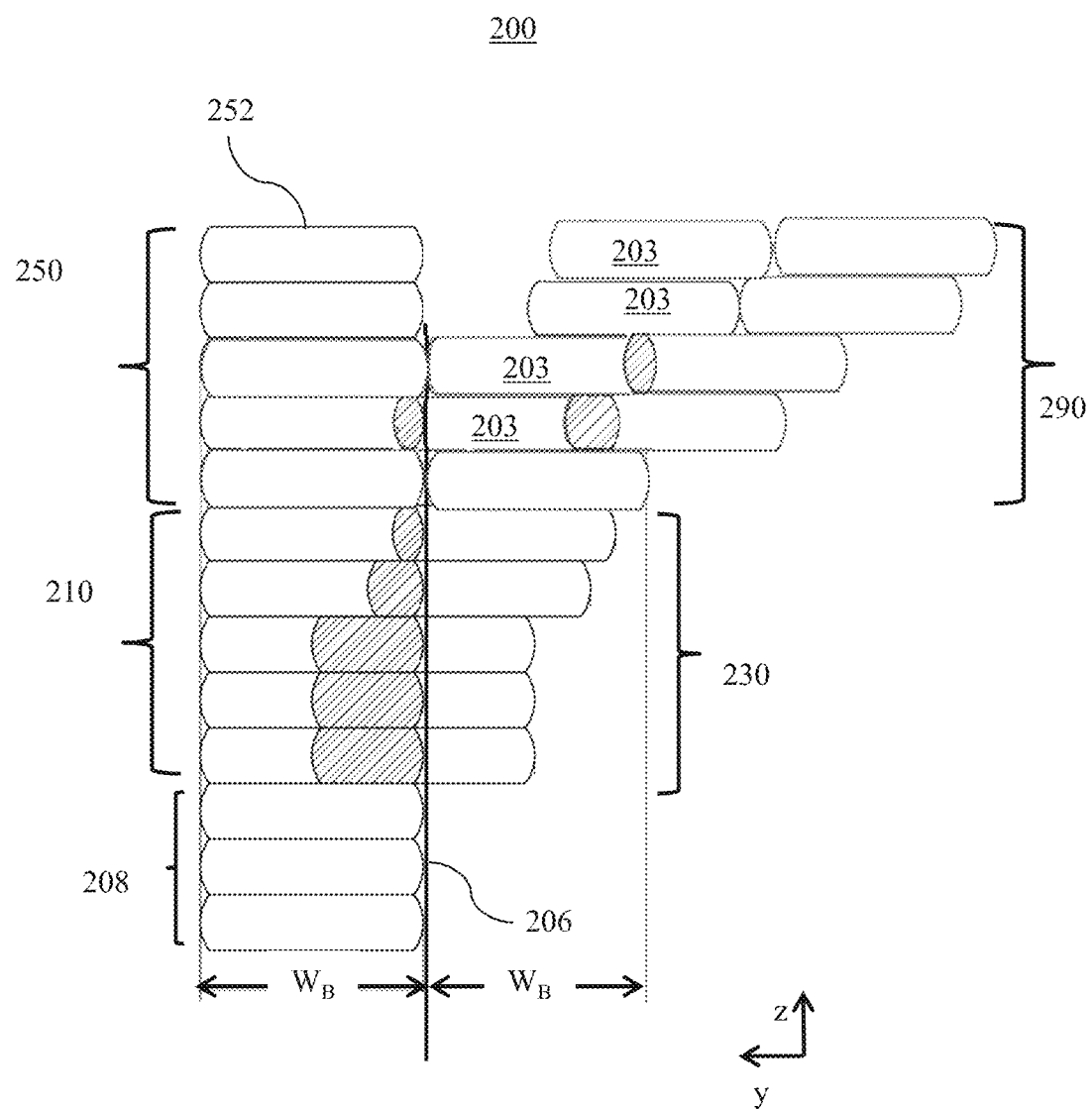
FIG. 14C is an exemplary cross-sectional diagram illustrating another alternative embodiment of the structure of FIG. 14A, wherein the structure includes one or more medium segments at a distance from the continuing section.

Turning to FIG. 14C, one medium segment 203 is shown as overlapping with both of the branch segment 254 and the continuing segment 252. One medium segment 203 is shown as overlapping with the branch segment 254 but not with the continuing segment 252. Each of the two medium segments 203 at the top are shown as being adjacent to the branch segment 254 and at a distance from the continuing segment 252. Being adjacent to the branch segment 254 can include being in contact, but without overlapping, with the branch segment 254.

Advantageously, the medium segment 203 can provide expansion to top area of the overhang section 290. By overlapping with at least one continuing segment 252, the medium segment 203 can strengthen connection with the continuing section 250 while branching out in a manner similar to the overhang section 290.

Figure 15:
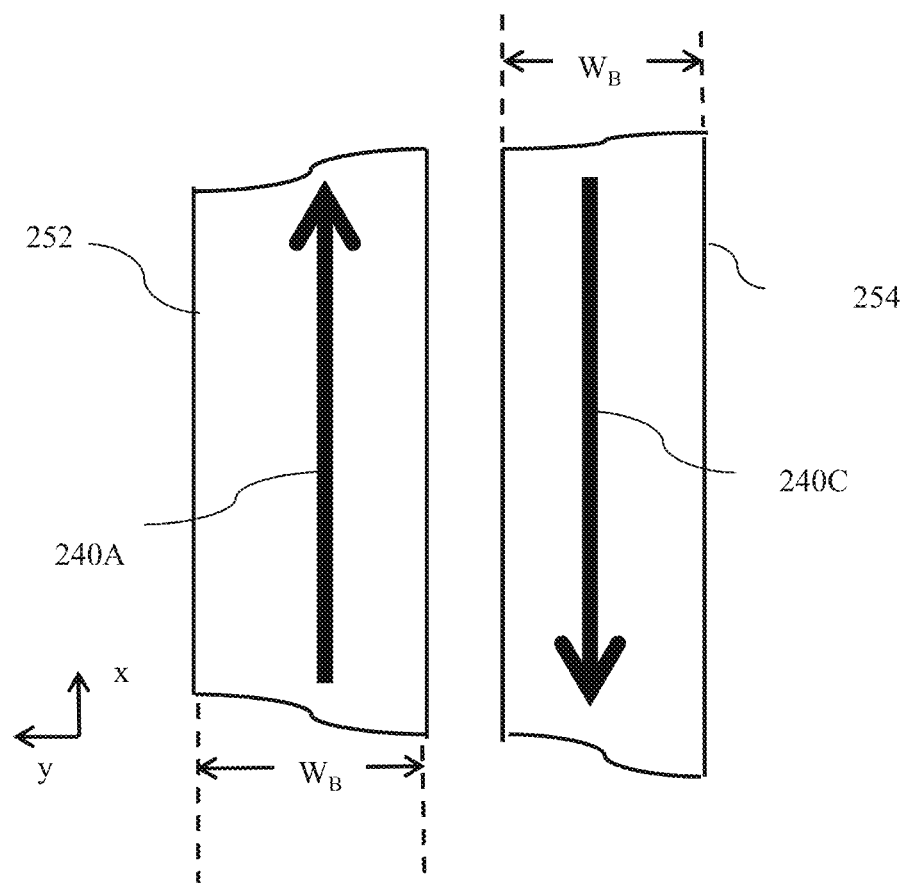
FIG. 15 is an exemplary diagram illustrating the structure of FIG. 14A, wherein a layer of the continuing section is shown.

Turning to FIG. 15, an exemplary layer 220 is shown in the x-y plane. The layer 220 is shown as including the continuing segment 252 and the branch segment 254 each having a width of WB. The continuing segment 252 and the branch segment 254 are shown as being printed according to toolpaths 240A, 240C, respectively. The toolpaths 240A, 240C are shown as being parallel and non-overlapping.

Optionally, the continuing segment 252 and the branch segment 254 can be printed using the same bead. Stated somewhat differently, the toolpaths 240A, 240C can be connected into one toolpath, so the system 100 (shown in FIG. 3) does not need to switch to a new toolpath or new bead between printing of the continuing segment 252 and printing of the branch segment 254.

Although FIG. 15 shows the toolpaths 240A, 240C as being in opposite directions for illustrative purposes only, directions of the toolpaths 240A, 240C can be the same and/or opposite, without limitation. Although FIG. 15 shows the toolpaths 240A, 240C as being parallel for illustrative purposes only, the toolpaths 240A, 240C can be parallel and/or non-parallel, without limitation.

Figure 16A:
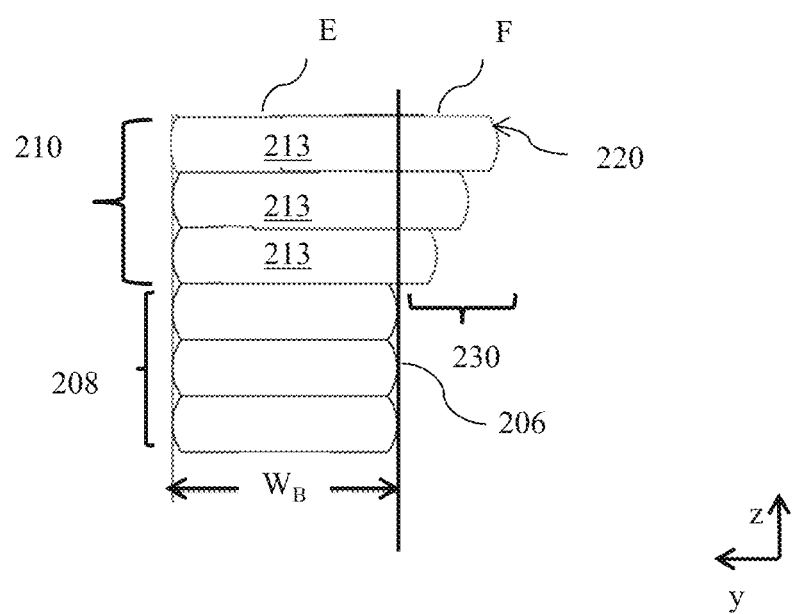
FIG. 16A is an exemplary cross-sectional diagram illustrating another alternative embodiment of the structure of FIG. 9A, wherein the structure includes one or more support segments.

Turning to FIG. 16A, the structure 200 is shown as optionally including a plurality of layers 220 stacked in the z direction. The layers 220 are shown as each including a support segment 213. Each support segment 213 can include a first portion E on the base section 208, and a second portion F overhanging or extending beyond the base section 208. The second portions F of the support segments 213 are shown as collectively forming the junction overhang section 230.

The support segment 213 is shown as being printed using a single toolpath and/or with a single bead. The bead is shown as being optionally wider than the base section 208. Stated somewhat differently, when the base section 208 is printed with a single bead of the selected width WB, the width of the bead for printing at least one of the support segment 213 can be greater than WB. During printing, a pump rate of the printed material from the printhead 120 (shown in FIG. 3) can be increased such that the width of the bead for printing the support segment 213 can be increased. Advantageously, the wide support segments 213 can form an overhang in a simplistic manner without increasing the number of beads or toolpaths for each layer 220.

The width of the support segment 213 is shown as being the smallest for the support segment 213 proximal to the base section 208, and being the greatest for the support segment 213 distal from the base section 208, and being medium for the support segment 213 in between. Stated somewhat differently, the bead width of the support segment 213 increases in the z direction. As a result, extension of the junction overhang section 230 beyond the base section 208 can increase as more support segment 213 stack along the z direction. Advantageously, the junction overhang section 230 can become large enough for usage purposes without significantly drooping over the edge region of the base section 208. The ratio of the widths of the support segments 213 to the width of the base section 208 or to WB can be any suitable values and, in one non-limiting example, can range from 1.02 to 1.25.

Figure 16B:
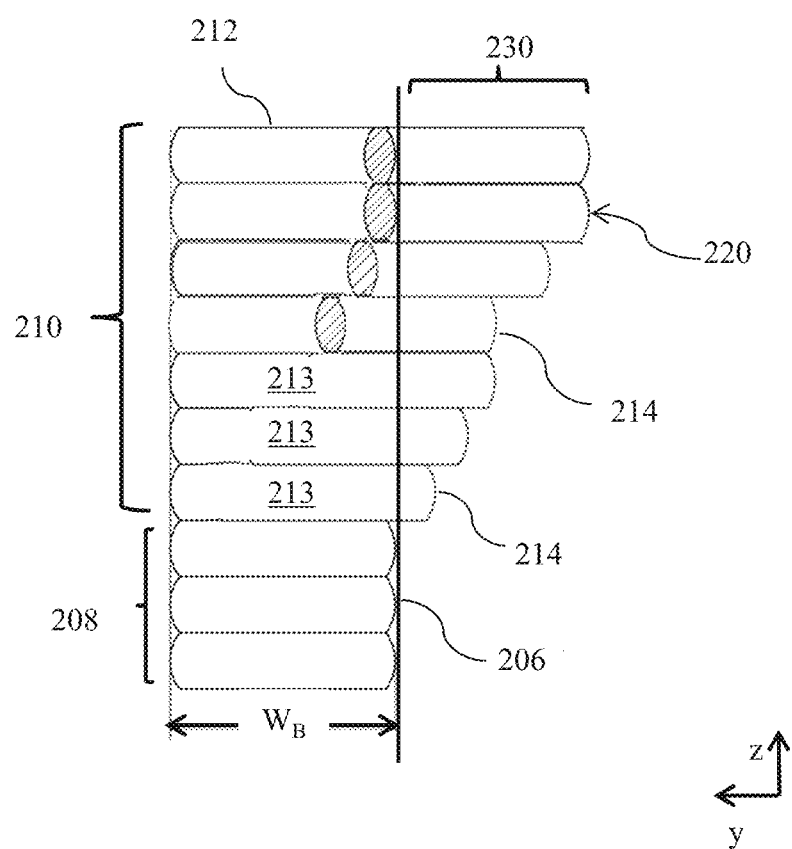
FIG. 16B is an exemplary cross-sectional diagram illustrating an alternative embodiment of the structure of FIG. 16A, wherein the structure includes one or more linking segments and one or more junction segments.

Turning to FIG. 16B, the structure 200 is shown as further including a plurality of layers 220 stacked in the z direction and on the support segments 213. The layers 220 are shown as each including the linking segment 212 and the junction segment 214 that is at least partially overlapped with the linking segment 212 by a selected overlapping amount.

The portion of the support segments 213, the linking segments 212 and the junction segments 214 that do not extend beyond the base section 208 are shown as collectively forming the linking section 210. The portion of the support segments 213, the linking segments 212 and the junction segments 214 that extend beyond the base section 208 are shown as collectively forming the junction overhang section 230.

The linking segment 212 and the junction segment 214 of the same layer 220 can have uniform and/or different widths. In one embodiment, the linking segment 212 can be printed using a single bead and/or using a single toolpath 240A (shown in FIG. 11A). The junction segment 214 can be printed using a single bead and/or using a single toolpath 240B (shown in FIG. 11A). FIG. 16B shows the linking segment 212 and the junction segments 214 of each layer 220 as having a width that is optionally less than or equal to the width of the base section 208. Stated somewhat differently, when the base section 208 is printed with a single bead of the selected width WB, the width of the bead for printing the linking segment 212 and/or the junction segment 214 can be less than or equal to WB. Thus, the junction segment 214 that contacts a support segment 213 can overhang beyond the support segment 213 by only a small amount, or have no overhang beyond the support segment 213. Advantageously, the junction segment 214 can be sufficiently supported by the support segment 213 and avoid significantly drooping over the edge region of the support segment 213.

During printing, a pump rate of the printed material from the printhead 120 (shown in FIG. 3) can be decreased such that the width of the bead for printing the linking segment 212 and/or the junction segment 214 can be decreased. Advantageously, two beads can be printed on, and supported by, the support segment 213 in a simplistic manner.

The width of the linking segment 212 and/or the junction segment 214 is shown as being the smallest in the layer 220 proximal to the support segment 213, and being the greatest in the layer 220 distal from the support segment 213, and being medium for the support segment 213 in between. Stated somewhat differently, the bead width of the linking segment 212 and/or the junction segment 214 increases along the z direction. As a result, extension of the junction overhang section 230 beyond the base section 208 can increase in a gradual manner as more linking segments 212 and junction segments 214 stack along the z direction. Advantageously, the junction overhang section 230 can gradually become large enough for usage purposes without significantly drooping of each layer 220, even if the overlapping amount does not change. In one embodiment, the widths of the linking segment 212 and the junction segment 214 in the same layer 220 can be the same and can be any suitable values. In a non-limiting example, the widths can range from 0.7 WB to WB, or to a value greater than WB.

Additionally and/or alternatively, the overlapping amount between the linking segment 212 and/or the junction segment 214 can be varied while width of the linking segment 212 and/or the junction segment 214 can be unchanged. For example, the pump rate can be unchanged for keeping the same bead width, while the overlapping amount can be varied via using the CAM program and/or the slicing software. Thus, the overlapping amount and the bead widths can be independently varied and the extent of overhang of each layer 220 can be controlled with great flexibility.

Although FIG. 16B shows the linking segment 212 and/or the junction segment 214 as being printed on the support segments 213 and printed with beads having a width less than the width of the base section 208 for illustrative purposes only, the linking segment 212 and/or the junction segment 214 can be printed on the base section 208 without the support segments 213, without limitation.

Figure 16C:
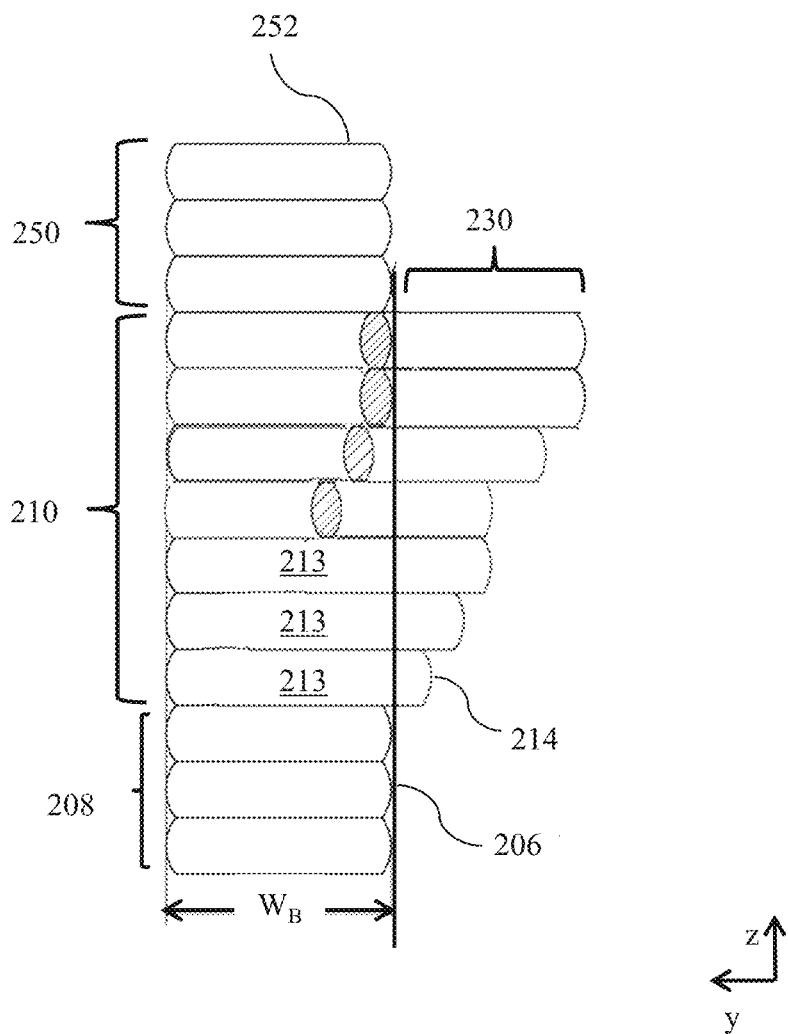
FIG. 16C is an exemplary cross-sectional diagram illustrating an alternative embodiment of the structure of FIG. 16B, wherein the structure includes a continuing section.

Turning to FIG. 16C, the structure 200 is shown as further including a plurality of layers 220 stacked in the z direction and each including an optional continuing segment 252. The continuing segment 252 is shown as having a width equal to WB. The continuing segments 252 are shown as being stacked to collectively form an optional continuing section 250. The continuing section 250 is shown as being stacked on the linking section 210.

Although FIG. 16C shows the structure 200 as including only the continuing section 250 on the linking section 210 for illustrative purposes only, the structure 200 can optionally include the branch overhang section 290 (shown in FIG. 14A) and/or the medium segment 203 (shown in FIG. 14B-14C), without limitation. The continuing section 250, the branch overhang section 290 and/or the medium segment 203 can each be printed with a bead that can have a width that can be adjusted, for example, by controlling the pump rate.

As described above, the main wall section 260 can branch into two walls when viewed in z-y plane. In the embodiments as described below, the main wall section 260 can be connected to a joint wall when viewed in x-y plane.

Joint Section 201 Joining The Main Wall Section 260 As Viewed In The X-Y Plane.

Figure 17A:
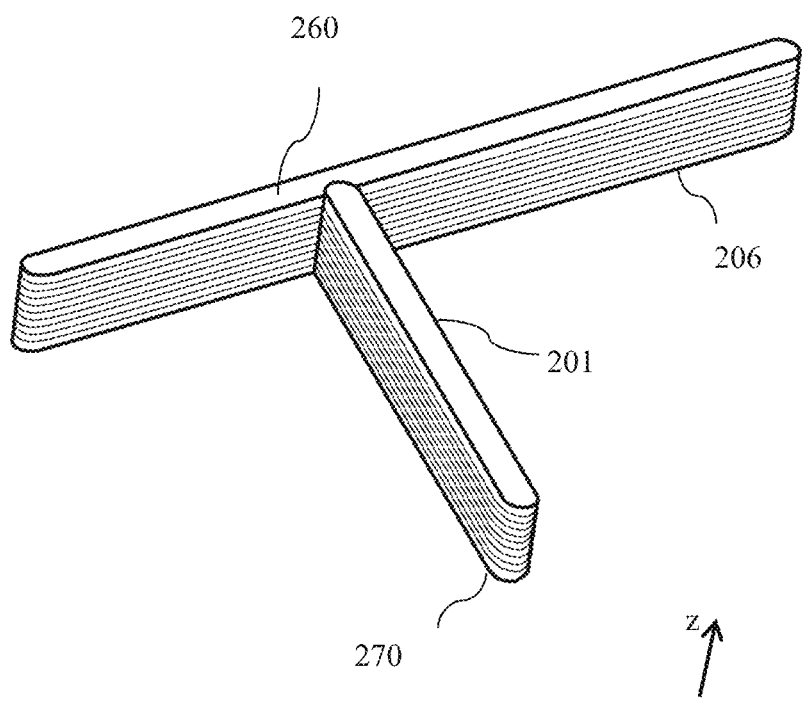
FIG. 17A is an exemplary perspective diagram illustrating another alternative embodiment of the structure of FIG. 4, wherein the structure includes a joint wall section.

In the following description, the joint section 201 is set forth as being a termination structure that includes a joint wall section 270 (shown in FIG. 17A) that joins with the main wall section 260. The joint wall section 270 and the main wall section 260 increase height concurrently as more and more layers 220 are printed. As shown in FIG. 17A, the exemplary structure 200 can include the main wall section 260 and the joint wall section 270. The joint wall section 270 can be used for joining the main wall section 260 with other structures (not shown) for strengthening the main wall section 260 and/or for aesthetic purposes.

Figure 2A:
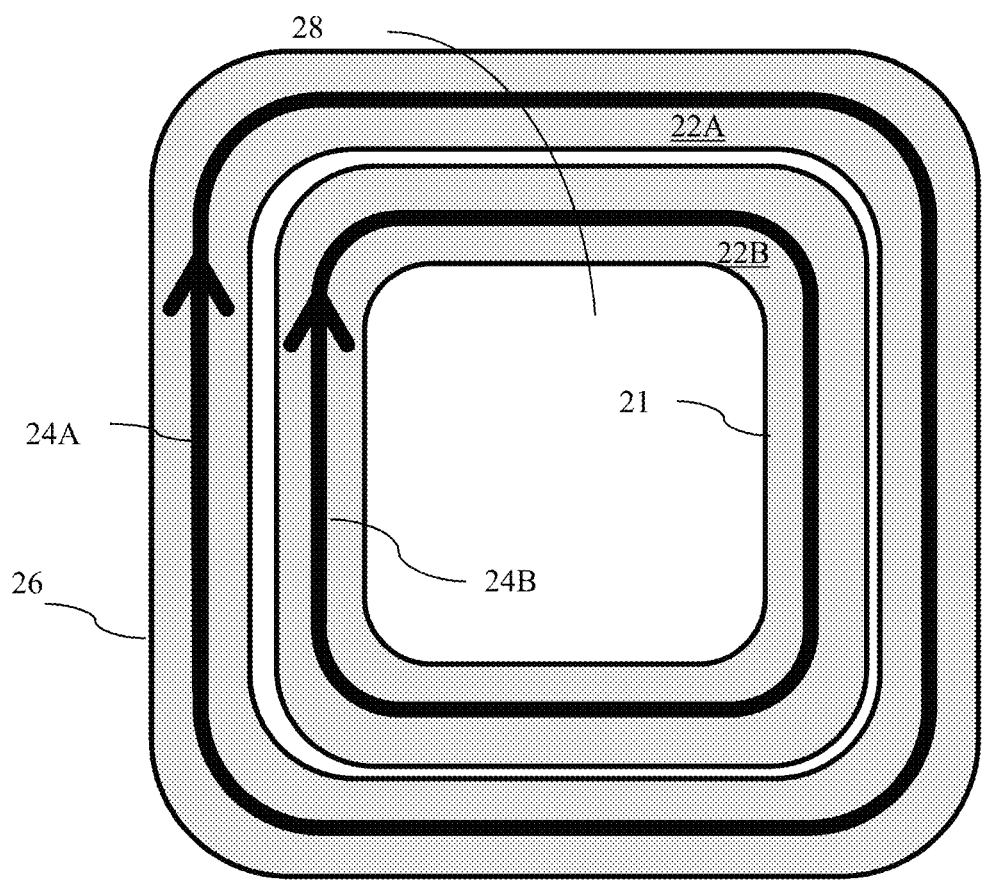
FIG. 2A is an exemplary diagram illustrating an alternative existing structure made by additive manufacturing.
Figure 2B:
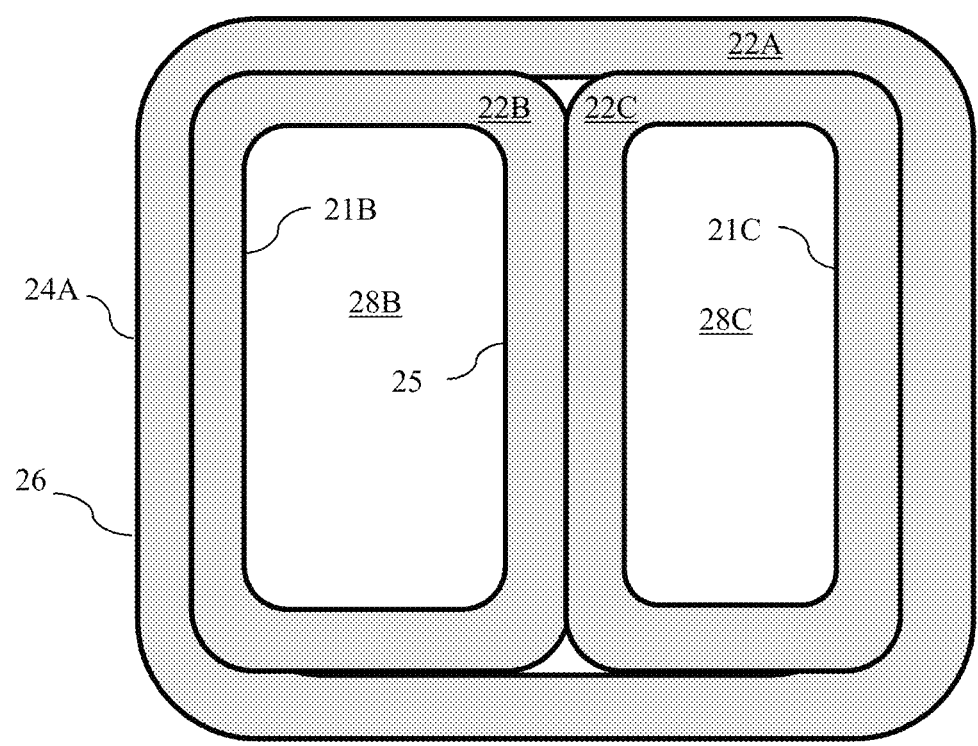
FIG. 2B is an exemplary diagram illustrating another alternative existing structure made by additive manufacturing, wherein the structure defines two voids.

The width of the joint wall section 270 can be defined by a distance between two opposing external edges of the joint wall section 270. The joint wall section 270 can be as narrow as a single bead. Stated somewhat differently, the joint wall section 270 can be printed in only one pass and/or with a single bead. Thus, in comparison with the conventional junction wall 25 (shown in FIG. 2B) that has a width no less than a two-bead width, printing efficiency for the joint wall section 270 can be improved and printing material can be saved. Advantageously, even if a large number of joint wall sections 270 are printed in a complex structure 200, impact on weight of the structure 200, printing efficiency and materials cost can be reduced.

Figure 17B:
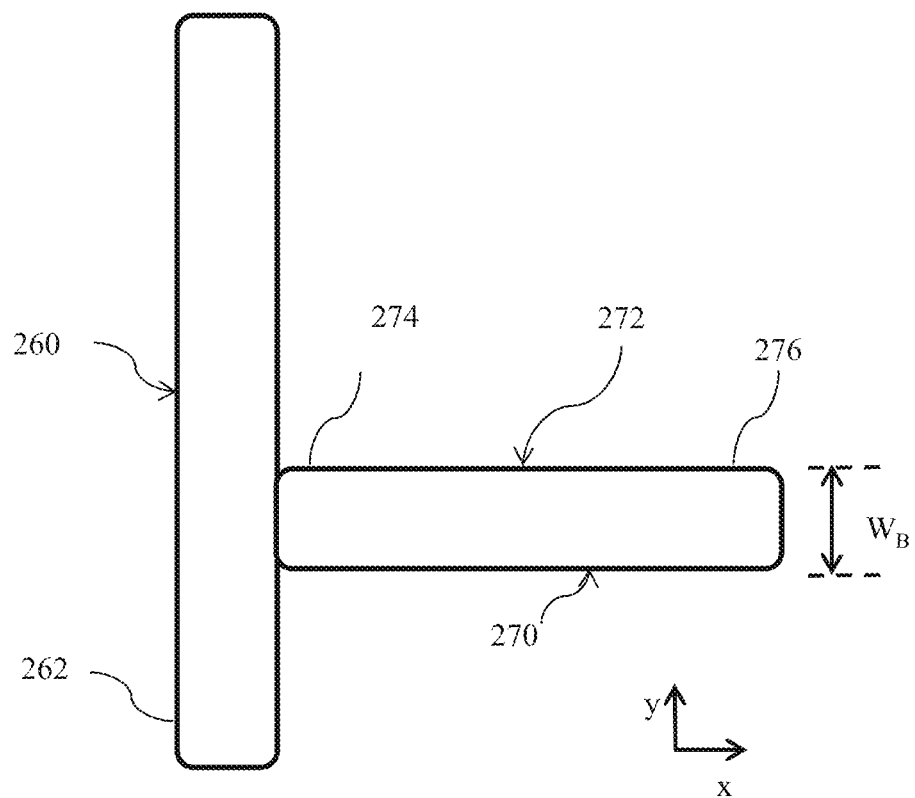
FIG. 17B is an exemplary diagram illustrating the structure of FIG. 17A, wherein a layer of the structure is shown.

Turning to FIG. 17B, an exemplary layer 220 for forming the structure 200 (shown in FIG. 17A) is shown in the x-y plane. The layer 220 is shown as including the main wall segment 262 and a joint wall segment 272 connected with the main wall segment 262. The joint wall segment 272 of one or more layers 220 can stack in the z direction and collectively form the joint wall section 270. The joint wall segment 272 is shown as having a first end region 274 and an optional second end region 276. FIG. 17A shows the joint wall section 270 as being connected with the main wall section 260 at the first end region 274.

The joint wall segment 272 is shown as having a width of WB. Stated somewhat differently, the joint wall segment 272 can be printed with a single bead. The first end region 274 can be a region where the bead starts or ends. Stated somewhat differently, the first end region 274 can correspond to a point where the toolpath starts or ends. Additionally and/or alternatively, the joint wall segment 272 can be printed with a single toolpath.

Although the joint wall segment 272 is shown in FIG. 17B as being a straight line that is vertical to the main wall segment 262, the joint wall segment 272 can include other shapes such as curve, polyline, and/or zigzag, and can form any angle with the main wall segment 262, without limitation. Although the joint wall segment 272 is shown in FIG. 17B as being in minimal contact with the main wall segment 262, the joint wall segment 272 can connect with the main wall segment 262 in any manner and/or overlap with the main wall segment 262 by any selected amount, without limitation. Although the joint wall segment 272 is shown as being connected to the main wall segment 262 for illustrative purposes only, the joint wall segment 272 can connect to any other structures of any sizes, shapes, and or dimensions, without limitation.

Optionally, the joint wall segment 272 and at least part of the main wall segment 262 can be printed using the same bead. Stated somewhat differently, the toolpath for printing the joint wall segment 272 can extend to print at least part of the main wall segment 262 and does not necessarily terminate at the second end region 276. Advantageously, the system 100 does not need to switch to a new toolpath or new bead between printing of the main wall segment 262 and printing of the joint wall segment 272.

Figure 18:
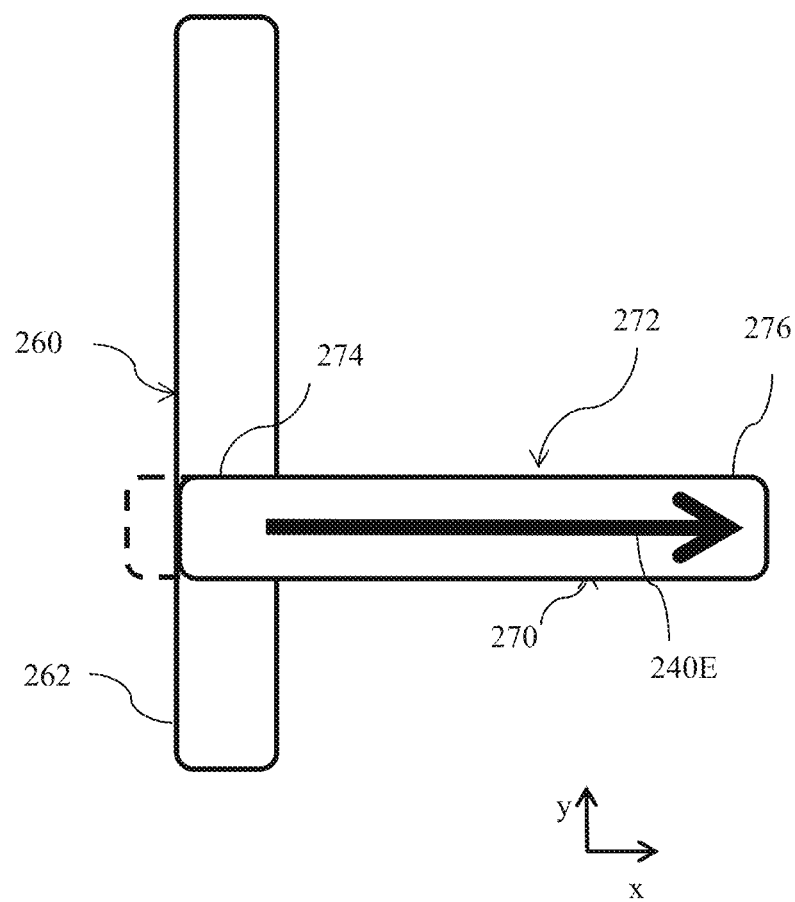
FIG. 18 is an exemplary diagram illustrating another alternative embodiment of the structure of FIG. 17A, wherein a toolpath defining the structure is shown.

Turning to FIG. 18, an exemplary layer 220 is shown. The joint wall segment 272 is shown as being printed according to a toolpath 240E. The toolpath 240E is shown as starting from the first end region 274 and optionally ending at the second end region 276.

The joint wall segment 272 can overlap with the main wall segment 262 by a selected amount. In one embodiment, the joint wall segment 272 can overlap with the main wall segment 262 by a length ranging from zero to the width W of the main wall segment 262. In another embodiment, the first end region 274 of the joint wall segment 272 can cross over the main wall segment 262 by a selected length. Stated somewhat differently, the first end region 274 can extend beyond the main wall segment 262 and terminate at a location defined by the dashed line as shown in FIG. 18.

Figure 19:
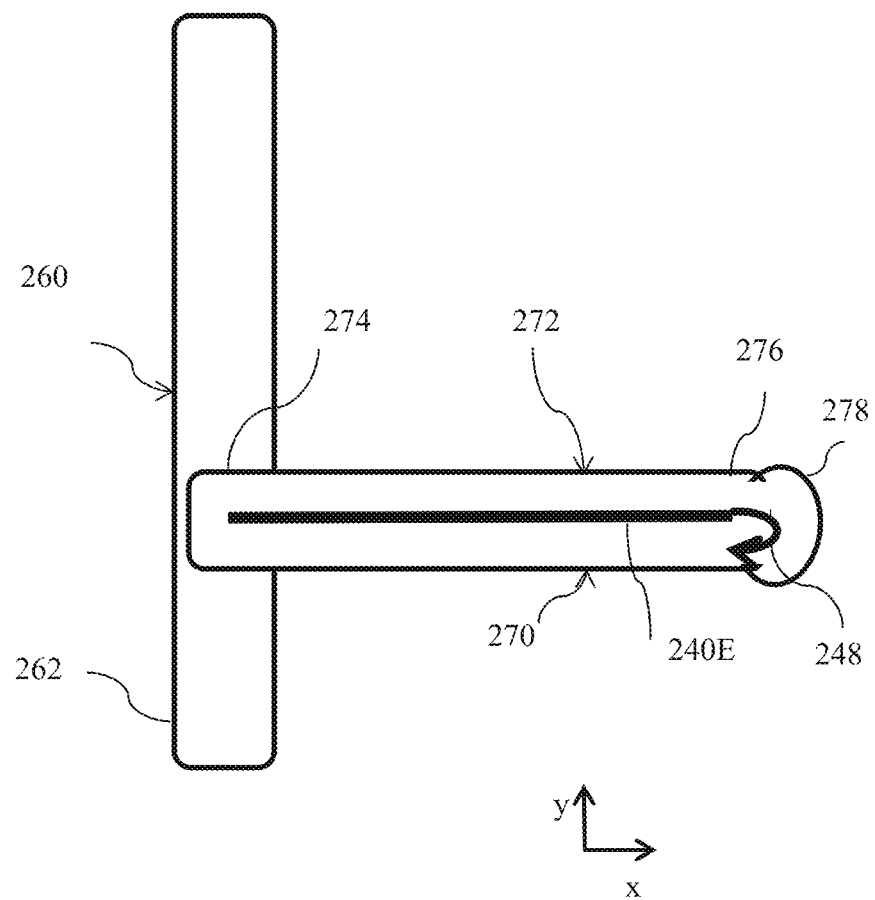
FIG. 19 is an exemplary diagram illustrating an alternative embodiment of the structure of FIG. 18, wherein the toolpath includes a path tip.

Turning to FIG. 19, the toolpath 240E is shown as including a path tip (or lead-out, or tip-wipe) 248 at the second end region 276. The path tip 248 can include a curve that turns by a selected angle. Exemplary angle can range from 45 degrees to 360 degrees. The print head 120 (shown in FIG. 3) can move along the path tip 248 upon the bead reaching the second end region 276. As a result, the second end region 276 can terminate with a rounded edge 278. Advantageously, the joint wall segment 272 can end in a smooth manner and appearance of the second end region 276 can be improved. An input control 660 (shown in FIG. 11B) can be used for defining the angle associated with the path tip 248.

Although FIG. 19 shows the path tip 248 as including a 180-degree turn to the right (when viewed in the x direction), the path tip 248 can include any suitable shape and can include a right turn, a left turn, or a combination thereof, without limitation.

Figure 20:
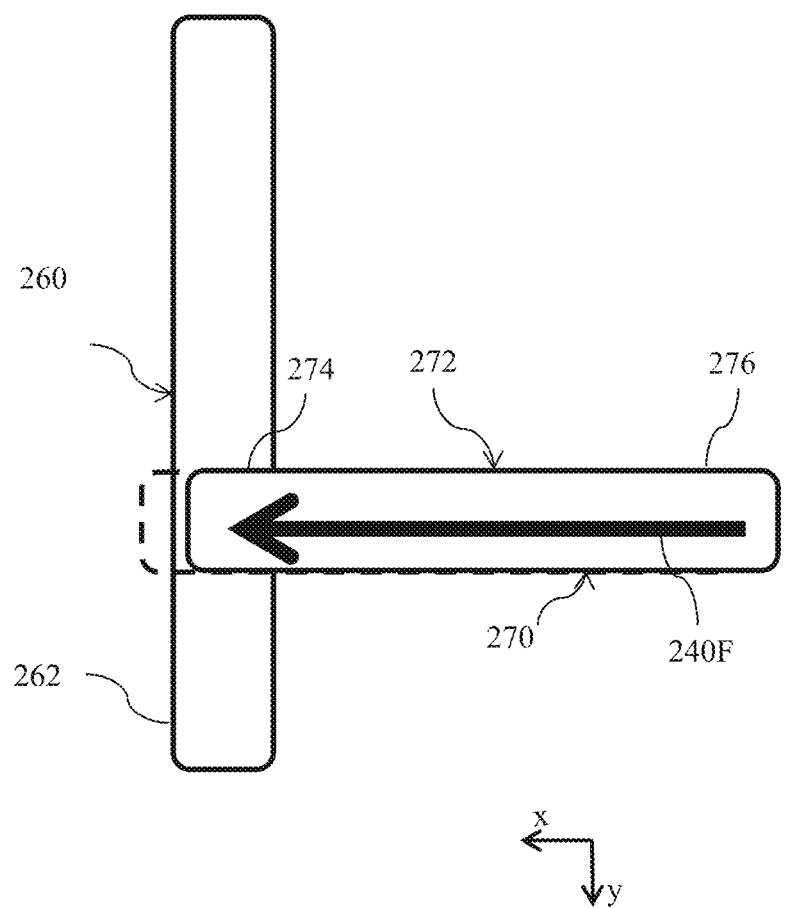
FIG. 20 is an exemplary diagram illustrating another alternative embodiment of the structure of FIG. 17A, wherein a toolpath defining the structure travels proximally toward a main wall section.

Turning to FIG. 20, an exemplary layer 220 is shown. The joint wall segment 272 is shown as being printed according to a toolpath 240F. The toolpath 240F is shown as starting optionally from the second end region 276 and ending at the first end region 274.

The joint wall segment 272 can overlap with the main wall segment 262 by a selected amount. In one embodiment, the joint wall segment 272 can overlap with the main wall segment 262 by a length less than or equal to the width W of the main wall segment 262. In another embodiment, the first end region 274 can cross over the main wall segment 262 by a selected length. Stated somewhat differently, the first end region 274 can extend beyond the main wall segment 262 and terminate at a location defined by the dashed line as shown in FIG. 20.

Optionally, a roller (not shown) of the system 100 (shown in FIG. 3) can roll on the joint wall segment 272 in the x direction to increase a contact area between the joint wall segment 272 and the main wall segment 262 and result in a more intimate connection therebetween. Advantageously, connection between the joint wall segment 272 and the main wall segment 262 can be strong.

Figure 21:
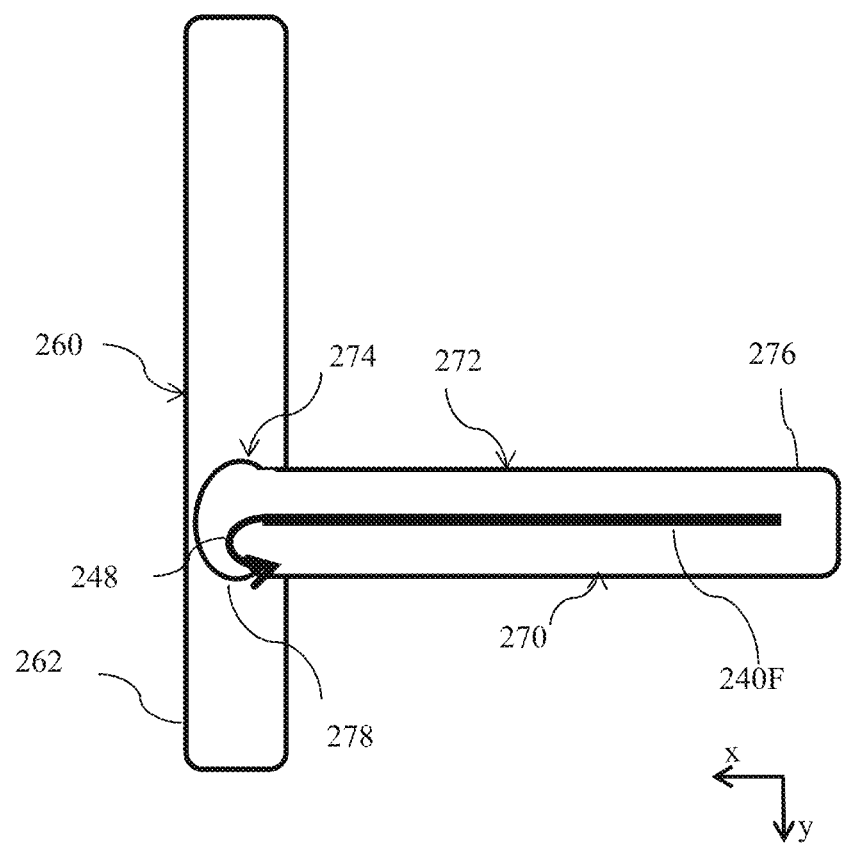
FIG. 21 is an exemplary diagram illustrating an alternative embodiment of the structure of FIG. 20, wherein the toolpath includes a path tip.

Turning to FIG. 21, the toolpath 240F is shown as including the path tip 248 at the first end region 274. The path tip 248 can include a curve that turns by the selected angle. Accordingly, the bead for printing the joint wall segment 272 can rotate upon reaching the first end region 274. As a result, the first end region 274 can terminate with a rounded edge 278. Additionally and/or alternatively, a contact area between the joint wall segment 272 and the main wall segment 262 can be increased. Advantageously, the joint wall segment 272 can end in a smooth manner with improved aesthetic appearance, even if the connection between the joint wall segment 272 and the main wall segment 262 may or may not be stronger in comparison with layer 220 shown in FIG. 18 or FIG. 20.

Turning to FIG. 22, an exemplary layer 220 is shown in the x-y plane. The layer 220 is shown as including a first main wall segment 262A and a second main wall segment 262B that faces the first main wall segment 262A. The first main wall segment 262A of a plurality of layers 220 can stack in the z direction and form a first main wall section 260A.

The second main wall segment 262B of a plurality of layers 220 can stack in the z direction and form a second main wall section 260B that faces the first main wall section 260A. The first and second main wall segments 262A, 262B are shown to be further connected via two loop segments 202. The first and second main wall segment 262A, 262B, and the loop segments 202 can collectively form a closed wall segment 204. Advantageously, the closed wall segment 204 can be printed using a single bead and/or using a single toolpath.

The joint wall segment 272 is shown as being defined by the toolpath 240E and connecting with the first and second main wall segments 262A, 262B at the first and second end regions 274, 276, respectively. Stated somewhat differently, the toolpath 240 starts from the first main wall segment 262A and ends at the second main wall segment 262B. The connection (also set forth similarly in FIG. 20) between the joint wall segment 272 and the main wall segment 262B is stronger than the connection (also set forth similarly in FIG. 18) between the joint wall segment 272 and the main wall segment 262A.

Figure 23:
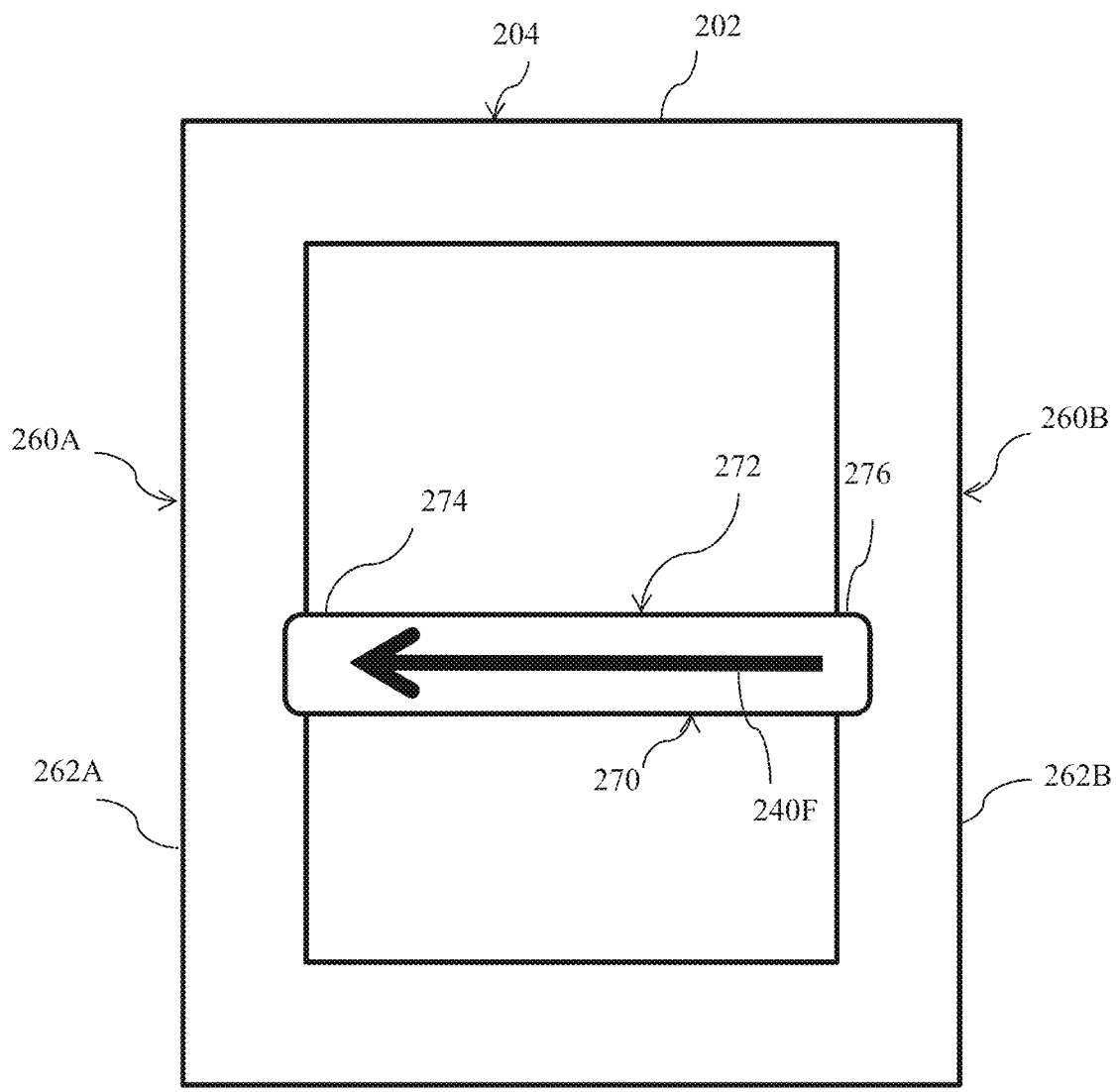
FIG. 23 is an exemplary diagram illustrating another alternative embodiment of the structure of FIG. 20, wherein the toolpath defining the structure travels proximally toward a first main wall section.

Turning to FIG. 23, an exemplary layer 220 is shown in the x-y plane. In contrast to FIG. 22, the joint wall segment 272 is shown as being defined by the toolpath 240F and connecting with the first and second main wall segments 262A, 262B at the first and second end regions 274, 276, respectively. Stated somewhat differently, the toolpath 240 starts from the second main wall segment 262B and ends at the first main wall segment 262A. The connection (also as set forth in FIG. 20) between the joint wall segment 272 and the main wall segment 262A is stronger than the connection (also as set forth in FIG. 18) between the joint wall segment 272 and the main wall segment 262B.

A pair of layers 220 each as shown in FIGS. 22 and 23 can be stacked because of having the same shape. Stated somewhat differently, the pair of layers 220 can include the layer 220 using the toolpath 240F and the layer 220 using the toolpath 240E (shown in FIG. 22) stacked thereon. In one embodiment, the joint wall segments 272 of the layers 220 can overlap. Multiple pair of layers 220 can stack to form the structure 200.

The two connections of one joint wall segment 272 to the main wall segments 262A, 262B can be of different strength. However, within each pair of layers 220, the two different types of connections are used once at each of the main wall segments 262A, 262B. Advantageously, within each pair of layers 220, respective connections of the joint wall segments 272 with the main wall segments 262A, 262B can be of equal total strength.

Figure 24:
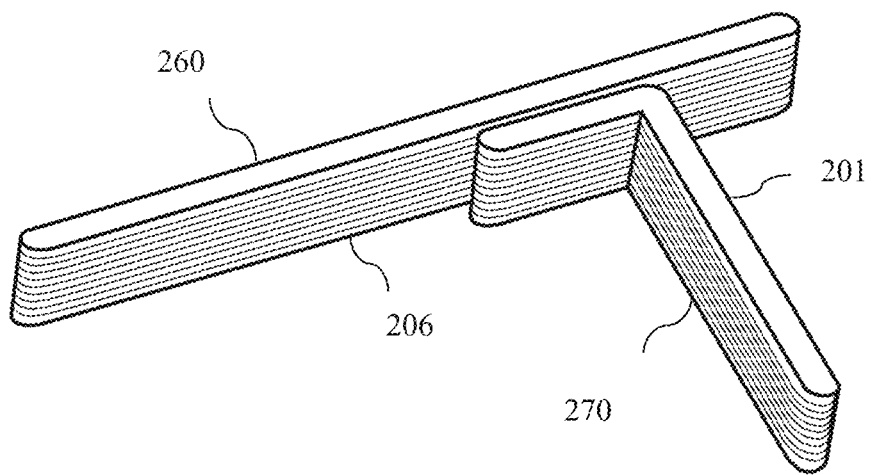
FIG. 24 is an exemplary diagram illustrating another alternative embodiment of the structure of FIG. 17A, wherein the joint wall section has an L shape.

Turning to FIG. 24, the joint wall section 270 is shown as having an L shape. Stated somewhat differently, the joint wall section 270 is shown as further extending along the main wall section 260 for a selected distance. The L-shaped joint wall section 270 can further increase the contact area between the joint wall section 270 and the main wall section 260. As a result, the connection between the joint wall section 270 and the main wall section 260 can be further strengthened.

Figure 25:
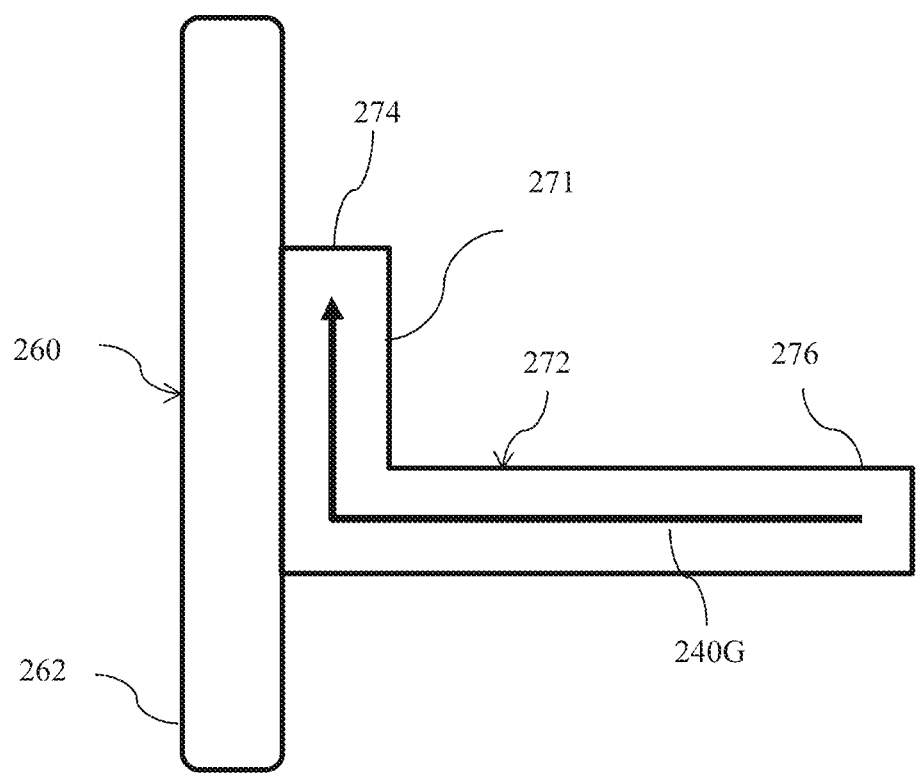
FIG. 25 is an exemplary diagram illustrating an alternative embodiment of the structure of FIG. 24, wherein a layer of the structure is shown.

Turning to FIG. 25, an exemplary layer 220 for forming the structure 200 (shown in FIG. 24) is shown in the x-y plane. The joint wall segment 272 is shown as further including an L joint segment 271 that extends over the selected distance while maintaining contact with the main wall segment 262. To maintain contact with the main wall segment 262, the L joint segment 271 can optionally overlap with the main wall segment 262 by an overlapping amount. The overlapping amount can be defined as a portion of the width of the L joint segment 271 that overlaps with the main wall segment 262. The overlapping amount can be a selected overlapping percentage of the width of the L joint segment 271 or the main wall segment 262. The overlapping percentage can be any suitable value. Exemplary overlapping percentage can range from 5% to 20%. The L joint segment 271, and the portion of the joint wall segment 272 extending distally from the main wall segment 262, can collectively form an L-shaped junction.

The joint wall segment 272 is shown as being printed according to a toolpath 240G. Although FIG. 23 shows the toolpath 240G as starting from the second end region 276 and ending at the first end region 274 for illustrative purposes only, the toolpath 240G can start from the first end region 274 and end at the second end region 276, without limitation. Because the L joint segment 271 provides additional contact area with the main wall section 260, connection between the joint wall segment 272 and the main wall segment 262 can be strong, regardless of direction of the toolpath 240G.

Figure 26:
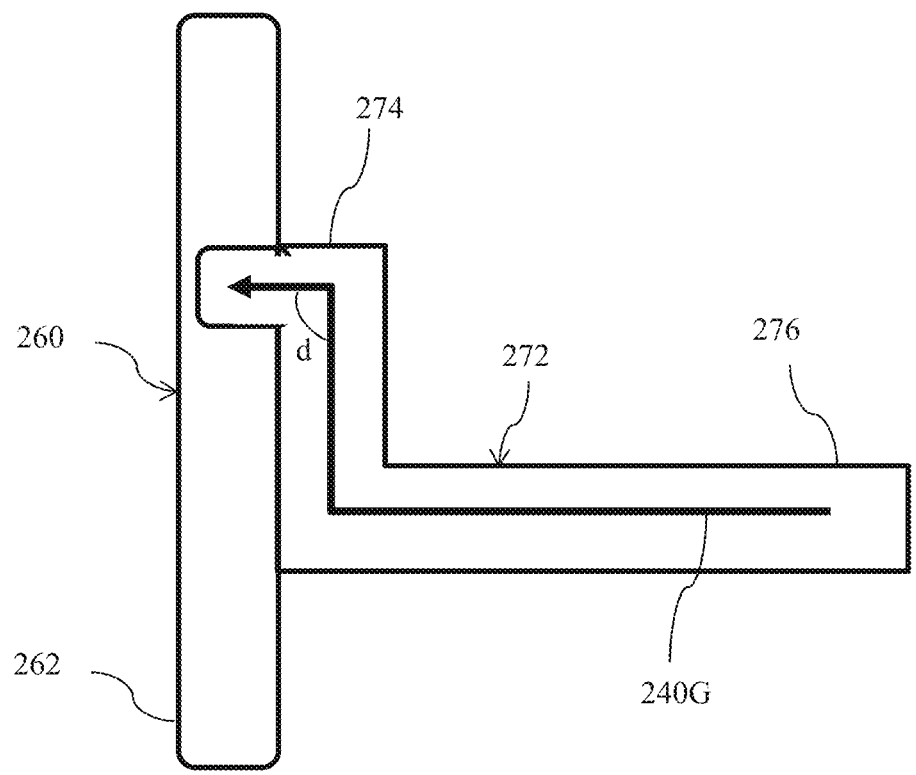
FIG. 26 is an exemplary diagram illustrating an alternative embodiment of the structure of FIG. 25, wherein a toolpath defining a joint wall segment of the joint wall section is shown.

Turning to FIG. 26, the joint wall segment 272 is shown as turning away from the L joint segment 271 by a selected angle d and overlapping with the main wall segment 262 by a selected amount at the first end region 274. The selected angle d is shown as being 90 degrees, for example. In one embodiment, the joint wall segment 272 can overlap with the main wall segment 262 by a selected length. For example, the selected length can range from zero to the width W of the main wall segment 262. Advantageously, connection between the joint wall segment 272 and the main wall segment 262 can be strong.

Figure 27:
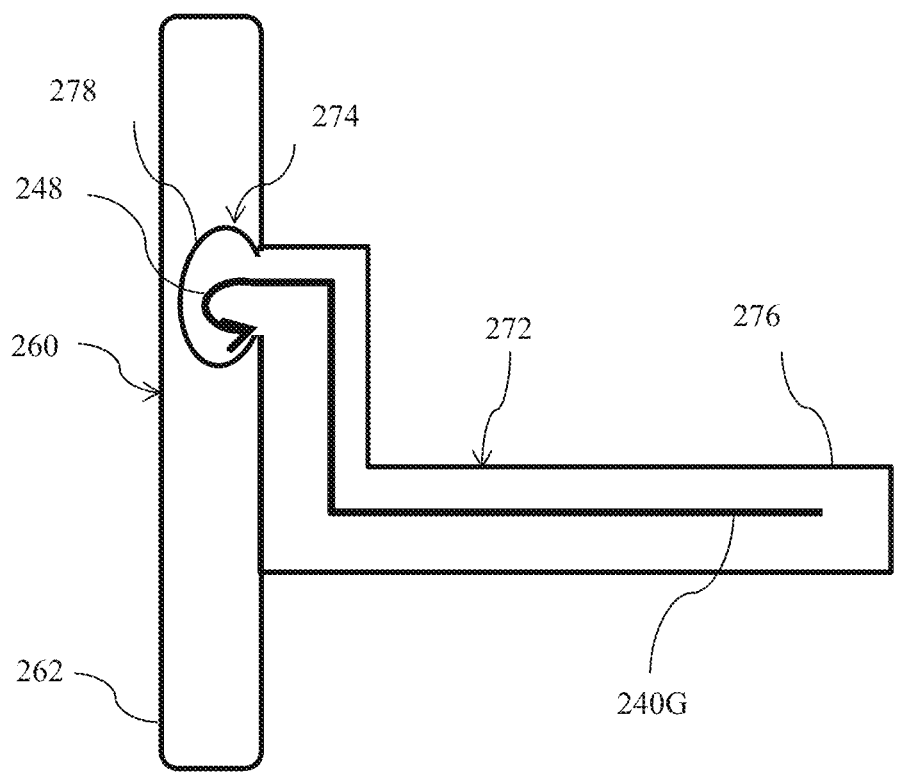
FIG. 27 is an exemplary diagram illustrating an alternative embodiment of the structure of FIG. 26, wherein the toolpath includes a path tip.

Turning to FIG. 27, the toolpath 240G is shown as including the path tip 248 at the first end region 274. Accordingly, the bead for printing the joint wall segment 272 can rotate at the first end region 274. As a result, the first end region 274 can terminate with a rounded edge 278. Additionally and/or alternatively, a contact area between the joint wall segment 272 and the main wall segment 262 can be increased. Advantageously, the joint wall segment 272 can end in a smooth manner and the connection between the joint wall segment 272 and the main wall segment 262 can be strong.

Figure 28:
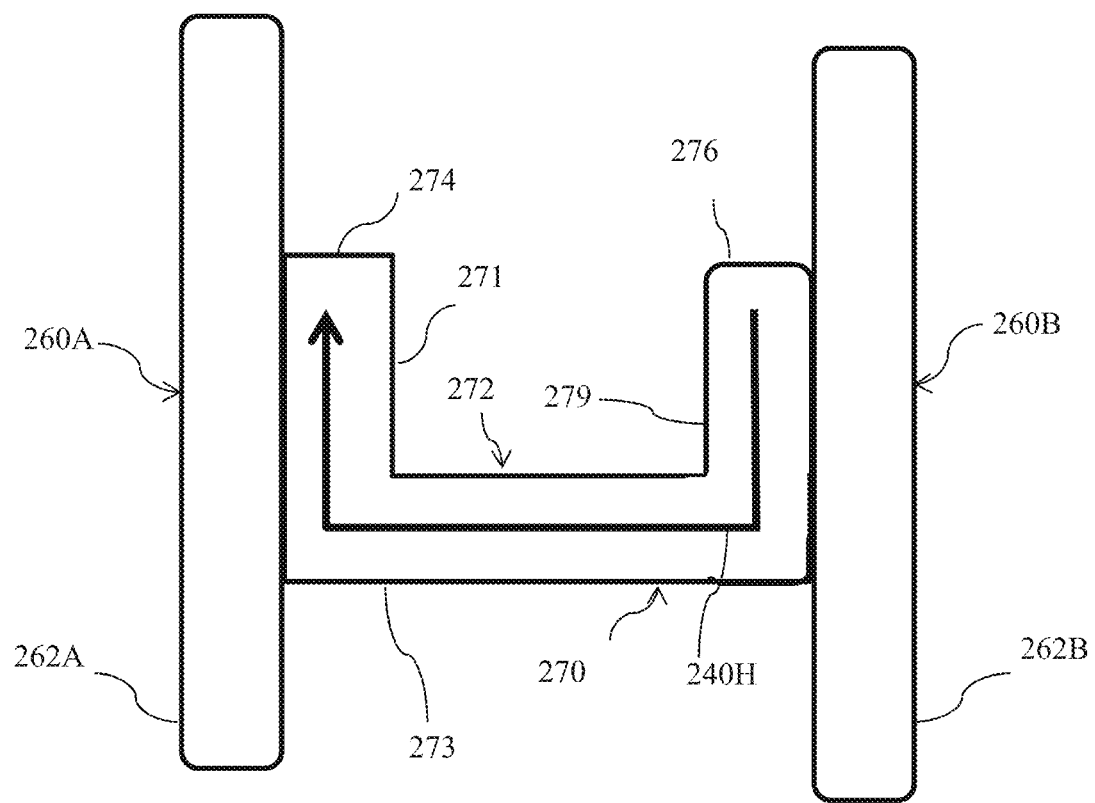
FIG. 28 is an exemplary diagram illustrating another alternative embodiment of the structure of FIG. 17A, wherein the structure includes first and second main wall sections.

Turning to FIG. 28, an exemplary layer 220 is shown in the x-y plane. The layer 220 is shown as including the first main wall segment 262A and the second main wall segment 262B that faces the first main wall segment 262A. FIG. 28 shows the joint wall segment 272 as connecting with the first and second main wall segments 262A, 262B at the first and second end regions 274, 276, respectively.

FIG. 28 shows the joint wall segment 272 as further including an L joint segment 279 that extends over the selected distance while maintaining contact with the second main wall segment 262B. Stated somewhat differently, the joint wall segment 272 can form an L-shaped junction with the second main wall segment 262B. Advantageously, the joint wall segment 272 can form strong connection with both the first and second main wall segments 262A, 262B.

FIG. 28 shows the joint wall segment 272 as being printed according to a toolpath 240H. The toolpath 240H is shown as having a C shape. Stated somewhat differently, the L joint segments 271, 279 extend at the same side of a bridge portion 273. The bridge portion 273 can include a portion of the joint wall segment 272 that is between the L joint segments 271, 279.

Although FIG. 28 shows the toolpath 240H as starting from the second end region 276 and ending at the first end region 274 for illustrative purposes only, the toolpath 240H can start from the first end region 274 and end at the second end region 276, without limitation.

Figure 29:
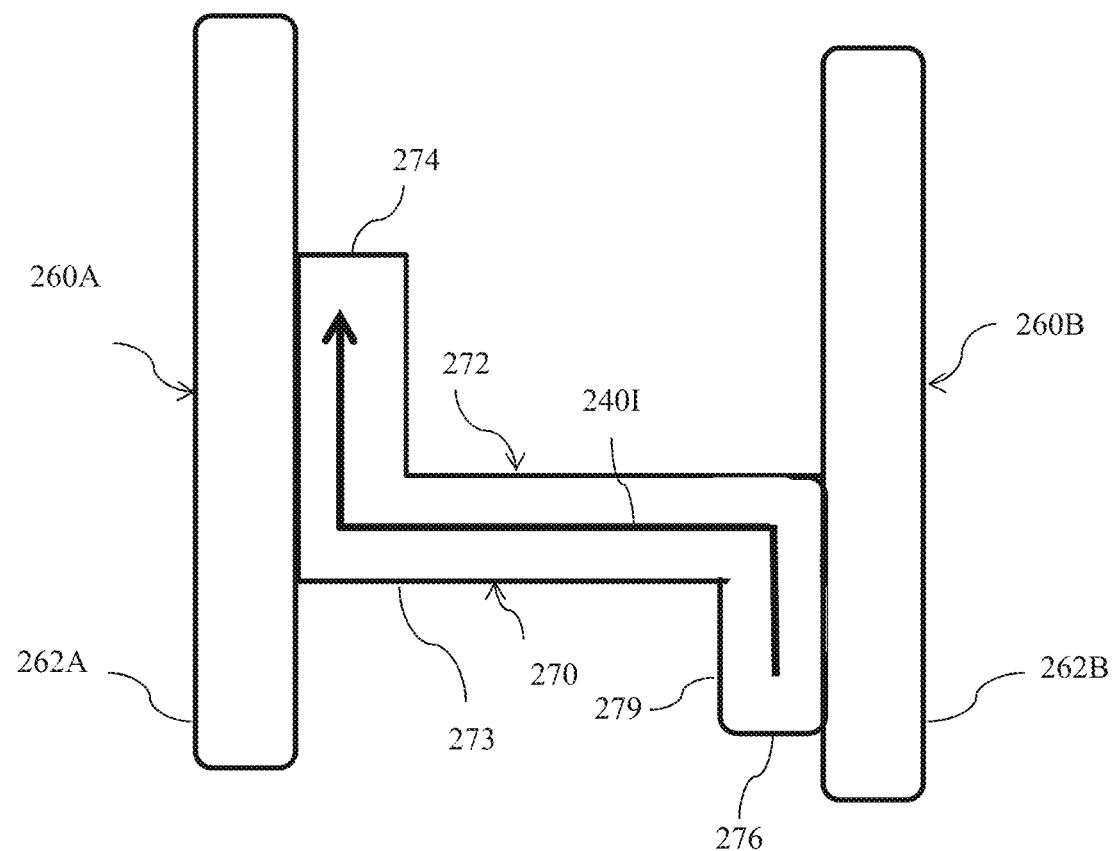
FIG. 29 is an exemplary diagram illustrating an alternative embodiment of the structure of FIG. 28, wherein the joint wall section connects to the first and second main wall sections.

Turning to FIG. 29, an exemplary layer 220 is shown in the x-y plane. The joint wall segment 272 is shown as being printed according to a toolpath 240I. The toolpath 240I is shown as having a Z shape. Stated somewhat differently, the L joint segments 271, 279 can extend at opposite sides of the bridge portion 273.

Figure 30:
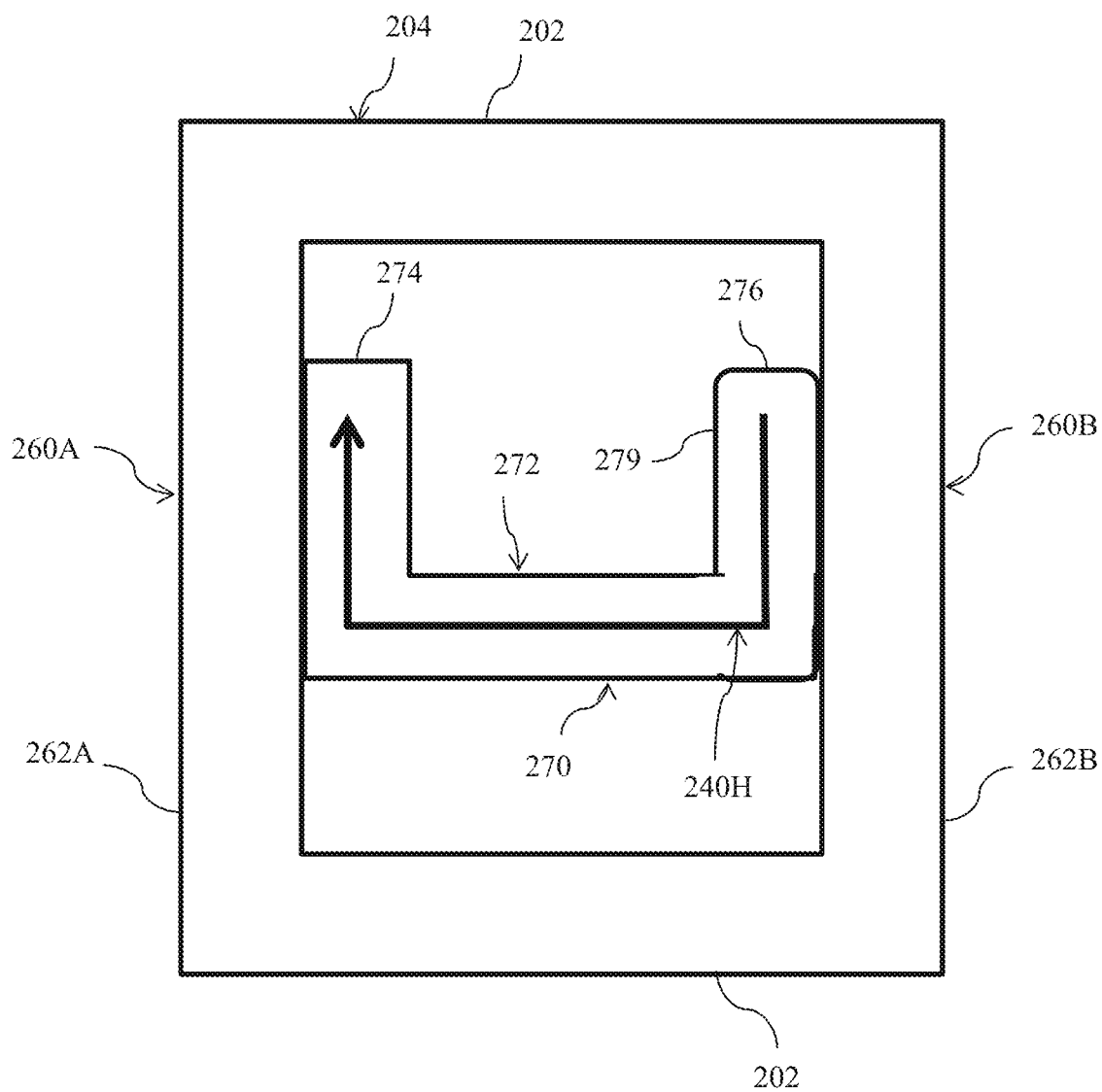
FIG. 30 is an exemplary diagram illustrating another alternative embodiment of the structure of FIG. 17A, wherein the first and second main wall sections are connected.

Turning to FIG. 30, the first and second main wall segments 262A, 262B are shown to be further connected via the two loop segments 202. The joint wall segment 272 is shown as including the L joint segments 271, 279. In one embodiment, the closed wall segment 204 and the joint wall segment 272 can be printed each with a single bead. Thus, the closed wall segment 204 and the joint wall segment 272 can be printed with two different beads and/two different toolpaths.

Control System 500

Figure 31:
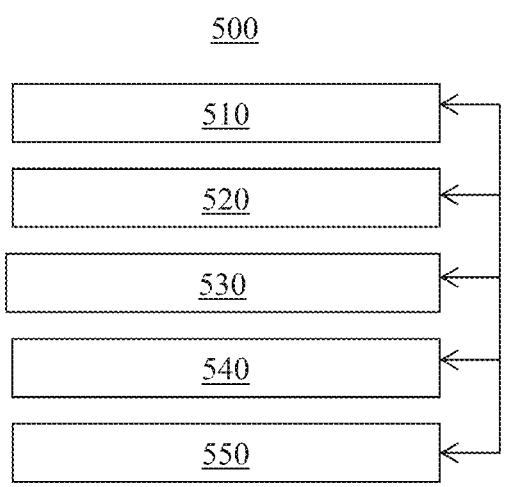
FIG. 31 is an exemplary diagram illustrating an embodiment of a control system for controlling the system of FIG. 3.

Turning to FIG. 31, a control system 500 for additive manufacturing is shown. The control system 500 can be configured for controlling the system 100 (shown in FIG. 3). The control system 500 can include a processor 510. The processor 510 can include one or more general-purpose microprocessors (for example, single or multi-core processors), application-specific integrated circuits, application-specific instruction-set processors, graphics processing units, physics processing units, digital signal processing units, coprocessors, network processing units, encryption processing units, and the like.

The processor 510 can execute instructions for implementing the control system 500 and/or computerized model of the structure 200 (shown in FIG. 4). In an un-limiting example, the instructions include one or more additive manufacturing software programs. Exemplary additive manufacturing software program can include G-code to control the system 100. The programs can operate to control the system 100 with multiple printing options, settings and techniques for implementing additive printing of large components.

The programs can include a CAD and/or CAM program to generate a 3D computer model of the structure 200. Additionally and/or alternatively, the 3D computer model can be imported any other conventional CAD and/or CAM programs and/or from another computer system. The 3D computer model can be solid, surface or mesh file format in an industry standard. The programs can include CAM slicing software to 'slice' the 3D computer model of the structure 200 into layers 220 and calculate the toolpath 240 (shown in FIG. 5) for defining each layer 220.

The programs can generate the machine code (including G-code, for example) for controlling the system 100 to print the structure 200. Additionally and/or alternatively, exemplary programs can include Unfolder Module Software, Bend Simulation Software, Laser Programming and/or Nesting Software available from Cincinnati Incorporated located in Harrison, Ohio.

As shown in FIG. 31, the control system 500 can include one or more additional hardware components as desired. Exemplary additional hardware components include, but are not limited to, a memory 520 (alternatively referred to herein as a non-transitory computer readable medium). Exemplary memory 520 can include, for example, random access memory (RAM), static RAM, dynamic RAM, read-only memory (ROM), programmable ROM, erasable programmable ROM, electrically erasable programmable ROM, flash memory, secure digital (SD) card, and/or the like. Instructions for implementing the control system 500 and/or computerized model of the structure 200 can be stored on the memory 520 to be executed by the processor 510.

Additionally and/or alternatively, the control system 500 can include a communication module 530. The communication module 530 can include any conventional hardware and software that operates to exchange data and/or instruction between the control system 500 and another computer system (not shown) using any wired and/or wireless communication methods. For example, the control system 500 can receive computer-design data corresponding to the structure 200 via the communication module 530. Exemplary communication methods include, for example, radio, Wireless Fidelity (Wi-Fi), cellular, satellite, broadcasting, or a combination thereof.

Additionally and/or alternatively, the control system 500 can include a display device 540. The display device 540 can include any device that operates to present programming instructions for operating the control system 500, display the 3D computer model of the structure 200, and/or present data related to the print head 120. Additionally and/or alternatively, the control system 500 can include one or more input/output devices 550 (for example, buttons, a keyboard, keypad, trackball), as desired.

The processor 510, the memory 520, the communication module 530, the display device 540, and/or the input/output device 550 can be configured to communicate, for example, using hardware connectors and buses and/or in a wireless manner.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for additive manufacturing, comprising:
preparing a base section defining a side wall parallel to a printing direction of a printer;
forming at least one junction overhang section at least indirectly connected to the base section and overhanging beyond the side wall, the junction overhang section including at least a portion of one or more beads that are each printed parallel to the sidewall and at least partially overhang beyond the side wall, wherein said forming includes forming via the printer included as part of a large-scale additive manufacturing system and includes printing the junction overhang section and a linking section joining with the junction overhang section, the linking section stacking on the base section; and
printing a continuing section and a branch overhang section, the continuing section stacking on the linking section, the branch overhang section stacking on the junction overhang section, wherein said printing the continuing section and the branch overhang section includes printing one or more layers each including a continuing segment and a branch segment not overlapping with the continuing segment, wherein the continuing segments of the layers stack at least partially in the stacking direction and collectively form the continuing section, and wherein the branch segments of the layers stack at least partially in the stacking direction and collectively form the branch overhang section.

2. The method of claim 1, wherein
said printing includes printing one or more layers being stacked, each layer including a linking segment and a junction segment at least partially overlapping with the linking segment,
the linking segments of the layers stack at least partially in the stacking direction and collectively form the linking section,
the junction segment includes an overlap portion that overlaps with the linking segment and a non-overlap portion that does not overlap with the linking segment, and the non-overlap portions of the layers stack at least partially in the stacking direction and collectively form the junction overhang section.

3. The method of claim 2, wherein said printing the one or more layers includes printing the linking segment and the junction segment in parallel and each having a width equal to a width of a single bead.

4. The method of claim 2, wherein said printing the one or more layers includes printing the junction segment overlapping with the linking segment by an overlap percentage, the overlap percentage associated with a first selected layer of the one or more layers being greater than the overlap percentage associated with a second selected layer of the one or more layers that is above the first selected layer in the stacking direction.

5. The method of claim 2, further comprising drawing, in a computerized image, two external surfaces respectively representing the linking section and the junction overhang section, the two external surfaces being spaced apart by a distance greater than a width of a single bead and less than a width of two beads, wherein said printing the junction overhang section and the linking section is based on said drawing.

6. The method of claim 2, further comprising configuring one or more slicing parameters associated with a computerized image representing the linking section and the junction overhang section such that the linking segment and the junction segment at least partially overlap, wherein said printing the junction overhang section and the linking section is based on said configuring.

7. The method of claim 2, further comprising determining a pump rate of a print head associated with said printing the one or more layers, wherein an increase of the pump rate increases overlapping of the linking segment and the junction segment.

8. The method of claim 1, wherein said preparing includes printing one or more layers stacked at least partially in the stacking direction and each having a width equal to a width of a single bead.

9. The method of claim 1, wherein said forming includes forming first and second junction overhang sections each on the base section and extending in opposite directions and distally from the base section.

10. The method of claim 9, wherein said forming the first and second junction overhang sections includes printing one or more layers each including first and second junction segments in parallel, a portion of the first junction segments of the layers overhang beyond the side wall and collectively form the first junction overhang section, and a portion of the second junction segments of the layers overhang beyond the side wall and collectively form the second junction overhang section.

11. The method of claim 1, wherein said forming includes printing one or more layers being stacked each including a support segment printed with a bead that is wider than the base section, the support segment having a first portion not overhanging beyond the base section and a second portion overhanging beyond the base section, the second portions of the layers collectively forming the junction overhang section.

12. The method of claim 11, wherein a width of a selected support segment of the layers is greater than a width of another support segment of the layers that is more proximal to the base section.

13. The method of claim 11, wherein said printing includes printing one or more layers being stacked on the support segments and each including a linking segment and a junction segment at least partially overlapping with the linking segment, the linking segment or the junction segment being printed with a bead that is narrower than the base section.

14. The method of claim 13, wherein a width of a selected linking segment of the layers is greater than a width of another linking segment of the layers that is more proximal to the base section.

15. A method for additive manufacturing, comprising:
preparing a base section defining a side wall parallel to a printing direction of a printer;
forming at least one junction overhang section at least indirectly connected to the base section and overhanging beyond the side wall, the at least one junction overhang section including at least a portion of one or more beads that are each printed parallel to the sidewall and at least partially overhang beyond the side wall, wherein said forming includes printing the at least one junction overhang section and a linking section joining with the at least one junction overhang section, the linking section stacking on the base section; and
printing a continuing section and a branch overhang section, the continuing section stacking on the linking section, the branch overhang section stacking on the at least one junction overhang section, wherein said printing the continuing section and the branch overhang section includes printing one or more layers each including a continuing segment and a branch segment not overlapping with the continuing segment, wherein the continuing segments of the layers stack at least partially in the stacking direction and collectively form the continuing section, and wherein the branch segments of the layers stack at least partially in the stacking direction and collectively form the branch overhang section.

16. The method of claim 10, wherein said forming includes forming via the printer included as part of a large-scale additive manufacturing system.

17. The method of claim 15, further comprising printing a medium segment between the continuing segment and the branch segment of a selected layer of the one or more layers, the medium segment overlapping with the continuing segment, the branch segment, or a combination thereof.

18. The method of claim 15, further comprising printing a medium segment between the continuing segment and the branch segment of a selected layer of the one or more layers, wherein the medium segment does not overlap with the continuing segment or the branch segment and is adjacent to the continuing segment, the branch segment, or a combination thereof.

19. The method of claim 15, wherein said printing the one or more layers includes printing the branch segment or the continuing segment having a width equal to a width of a single bead, and the continuing segment and the branch segment are in parallel.

20. The method of claim 15, wherein said printing the one or more layers includes printing the branch segment at a distance from the continuing segment, the distance associated with a first selected layer of the one or more layers being smaller than the distance associated with a second selected layer of the one or more layers that is above the first selected layer in the stacking direction.

21. A structure made via an additive manufacturing process, said additive manufacturing process comprising:
preparing a base section defining a side wall parallel to a printing direction of a printer;
forming at least one junction overhang section at least indirectly connected to the base section and overhanging beyond the side wall, the junction overhang section including at least a portion of one or more beads that are each printed parallel to the sidewall and at least partially overhang beyond the side wall, wherein said forming includes forming via the printer included as part of a large-scale additive manufacturing system and includes printing the junction overhang section and a linking section joining with the junction overhang section, the linking section stacking on the base section; and
printing a continuing section and a branch overhang section, the continuing section stacking on the linking section, the branch overhang section stacking on the junction overhang section, wherein said printing the continuing section and the branch overhang section includes printing one or more layers each including a continuing segment and a branch segment not overlapping with the continuing segment, wherein the continuing segments of the layers stack at least partially in the stacking direction and collectively form the continuing section, and wherein the branch segments of the layers stack at least partially in the stacking direction and collectively form the branch overhang section.

22. The structure of claim 21, wherein said at least one junction overhang section comprises a plurality of junction segments stacked at least partially in a stacking direction associated with the printer, a first selected junction segment of the plurality of junction segments overhanging beyond a second selected junction segment of the plurality of junction segments that is below the first selected junction segment.

* * * * *